United States Patent
Yang

(10) Patent No.: US 12,464,149 B2
(45) Date of Patent: Nov. 4, 2025

(54) VIDEO DECODER WITH CONFIGURABLE REFERENCE CACHE AND ON-CHIP MEMORY BUFFER

(71) Applicant: QUALCOMM Incorporated, San Diego, CA (US)

(72) Inventor: Shengqi Yang, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 18/443,946

(22) Filed: Feb. 16, 2024

(65) Prior Publication Data
US 2025/0267300 A1    Aug. 21, 2025

(51) Int. Cl.
*H04N 19/423* (2014.01)
*H04N 19/167* (2014.01)
*H04N 19/80* (2014.01)

(52) U.S. Cl.
CPC ......... *H04N 19/423* (2014.11); *H04N 19/167* (2014.11); *H04N 19/80* (2014.11)

(58) Field of Classification Search
CPC ..... H04N 19/423; H04N 19/167; H04N 19/80
See application file for complete search history.

(56) References Cited

U.S. PATENT DOCUMENTS

| | | | |
|---|---|---|---|
| 2018/0103260 A1* | 4/2018 | Chuang | H04N 19/70 |
| 2019/0043204 A1* | 2/2019 | Mandal | G06F 18/22 |
| 2020/0145659 A1* | 5/2020 | Kotra | H04N 19/96 |
| 2023/0421998 A1 | 12/2023 | Bhave et al. | |
| 2024/0187611 A1* | 6/2024 | Zhang | H04N 19/30 |
| 2025/0077119 A1 | 3/2025 | Hao et al. | |

FOREIGN PATENT DOCUMENTS

| | | |
|---|---|---|
| CN | 117135362 A | 11/2023 |
| WO | 2023015520 A1 | 2/2023 |

OTHER PUBLICATIONS

Jou Shiaw-Yu et al: "Fast Motion Estimation Algorithm and Design for Real Time QFHD High Efficiency Video Coding", IEEE Transactions on Circuits and Systems for Video Technology, IEEE, USA, vol. 25, No. 9, Sep. 1, 2015.*
International Search Report and Written Opinion—PCT/US2025/014920—ISA/EPO—Apr. 23, 2025.
Jou S-Y., et al., "Fast Motion Estimation Algorithm and Design for Real Time QFHD High Efficiency Video Coding", IEEE Transactions on Circuits and Systems for Video Technology, IEEE, USA, vol. 25, No. 9, Sep. 1, 2015, pp. 1533-1544, XP011667815, section IV.C second paragraph.

* cited by examiner

*Primary Examiner* — Shahan Ur Rahaman
(74) *Attorney, Agent, or Firm* — MooreIP/Qualcomm

(57) ABSTRACT

A device includes an on-chip memory and one or more processors coupled to the on-chip memory. The one or more processors are configured to configure a reference cache of the on-chip memory to have a reference cache size based on video coding information. The on-chip memory includes an on-chip memory region that is external to the reference cache. The one or more processors are also configured to assign a portion of the on-chip memory region to buffer data associated with operation of a video decoder.

20 Claims, 13 Drawing Sheets

VIDEO DECODER WITH CONFIGURABLE REFERENCE CACHE AND ON-CHIP MEMORY BUFFER

I. FIELD

The present disclosure is generally related to decoding video data.

II. DESCRIPTION OF RELATED ART

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC) and extensions of such standards. Such video devices may transmit, receive, encode, decode, and/or store digital video information more efficiently by implementing such video coding techniques.

Conventionally, a video device can implement a video playback dataflow that includes a video decoder receiving an input data frame via a bitstream and generating a reconstructed frame (a "decoded frame") of the video. The video decoder reconstructs the frame portion-by-portion. For example, the video decoder generates reconstructed image portions from left-to-right and top-to-bottom of the reconstructed frame.

In some examples, an image portion of the reconstructed frame has dependency on surrounding image portions of the reconstructed frame. To illustrate, the video decoder generates a left image portion that has a dependency on a right image portion that is adjacent to and on the right of the left image portion. Right boundary pixels of the left image portion are to be adjusted based on left boundary pixels of the right image portion to preserve continuity between the image portions. The adjusted left image portion and the adjusted right image portion are provided to a display memory and provided to a display device via a display refresh. In some examples, the adjusted image portions are also stored in a reference cache to be used, e.g., during inter-frame prediction, to reconstruct additional image portions. Reconstructing surrounding image portions and performing the adjustment causes delay in displaying an image portion. On the other hand, using the reconstructed image portions without adjustment as reference image portions can reduce quality of subsequently reconstructed image portions.

III. SUMMARY

According to a particular implementation of the techniques disclosed herein, a device includes an on-chip memory and one or more processors coupled to the on-chip memory. The one or more processors are configured to configure a reference cache of the on-chip memory to have a reference cache size based on video coding information. The on-chip memory includes an on-chip memory region that is external to the reference cache. The one or more processors are also configured to assign a portion of the on-chip memory region to buffer data associated with operation of a video decoder.

According to a particular implementation of the techniques disclosed herein, a method includes configuring, at a device, a reference cache of an on-chip memory to have a reference cache size based on video coding information. The on-chip memory includes an on-chip memory region that is external to the reference cache. The method also includes assigning, at the device, a portion of the on-chip memory region to buffer data associated with operation of a video decoder.

According to a particular implementation of the techniques disclosed herein, a non-transitory computer-readable medium includes instructions that, when executed by one or more processors, cause the one or more processors to configure a reference cache of an on-chip memory to have a reference cache size based on video coding information. The on-chip memory includes an on-chip memory region that is external to the reference cache. The instructions, when executed by one or more processors, also cause the one or more processors to assign a portion of the on-chip memory region to buffer data associated with operation of a video decoder.

Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Systems and methods to perform video decoding using a video decoder with a configurable reference cache and on-chip memory buffer are disclosed. In conventional video decoding techniques, a video decoder reconstructs an image frame portion-by-portion. For example, the video decoder generates reconstructed image portions from left-to-right and top-to-bottom of the reconstructed frame. In some examples, when an image portion of the reconstructed frame has dependency on surrounding image portions of the reconstructed frame, the surrounding image portions are reconstructed prior to adjusting a particular image portion and the adjusted image portion is provided to the display memory, which causes delay that can adversely impact user experience. When the adjusted image portion corresponds to a reference image portion, the adjusted image portion is stored in a reference cache to be used to generate additional image portions.

The disclosed systems and methods include techniques to configure a reference cache and an on-chip memory buffer so that the on-chip memory buffer can be used to store a reconstructed image portion concurrently with providing the reconstructed image portion to a display memory. The reconstructed image portion is available in the on-chip memory buffer for any adjustment to be performed after reconstruction of surrounding image portions. The adjusted image portion can be stored in the reference cache to be used for reconstruction of additional image portions. In some examples, a size of the reference cache is configured based on video coding information (e.g., codec and coding unit information) of the video decoder. The on-chip memory includes the reference cache and an on-chip memory region that is external to the reference cache. One or more portions of the on-chip memory region are assigned as the on-chip memory buffer that can be used to store reconstructed image portions. Providing the reconstructed image portions (e.g., prior to adjustment) to the display memory reduces latency, while storing the adjusted image portions in the reference cache maintains quality of subsequent reconstruction of dependent image portions.

Figure 1:
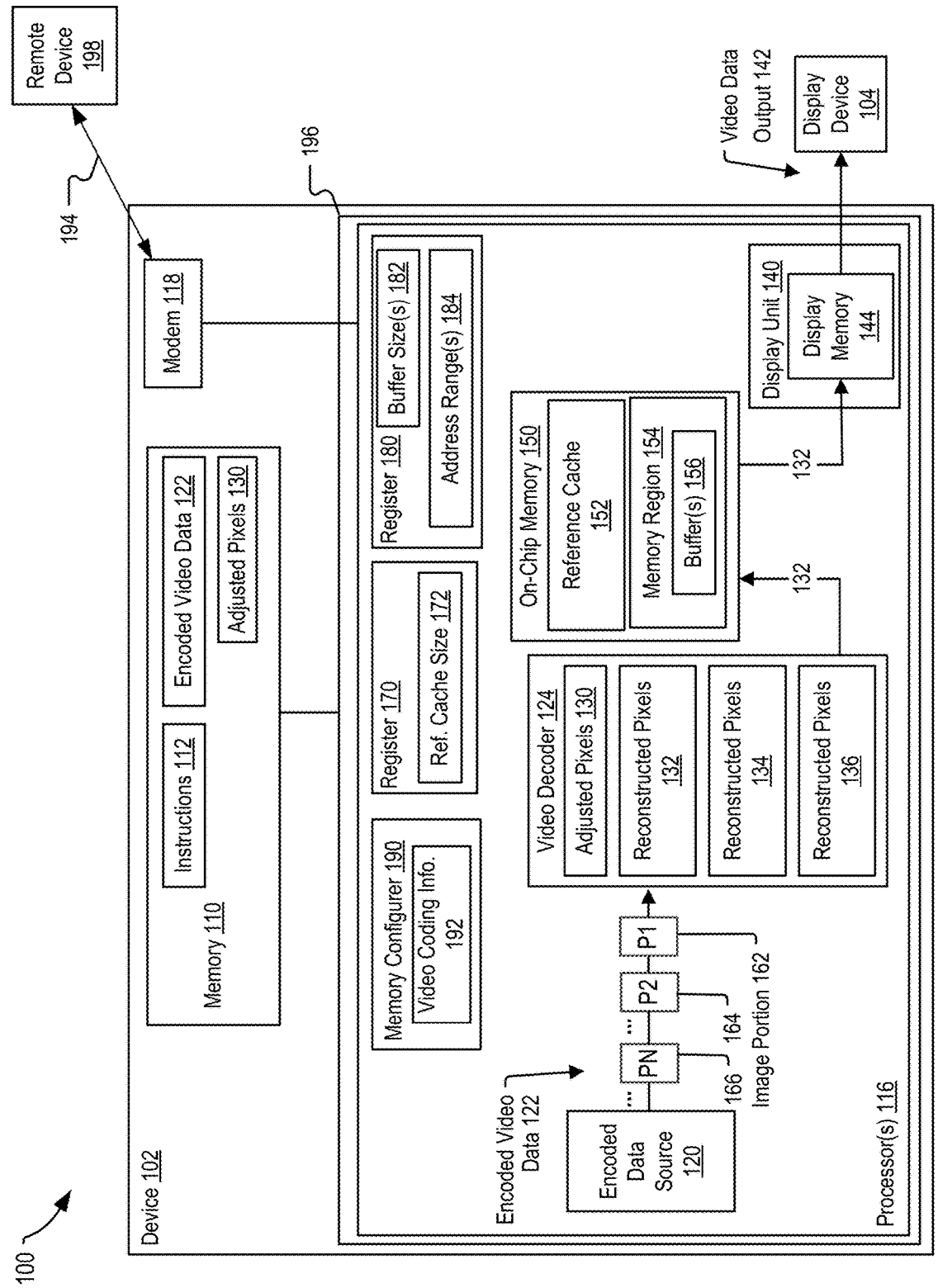
FIG. 1 is a block diagram illustrating an example of an implementation of a system operable to perform video decoding using a video decoder with a configurable reference cache and on-chip memory buffer, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 116 of FIG. 1), which indicates that in some implementations the device 102 includes a single processor 116 and in other implementations the device 102 includes multiple processors 116. For ease of reference herein, such features are generally introduced as "one or more" features and are subsequently referred to in the singular or optional plural (as indicated by "(s)" in the name of the feature) unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "obtaining," "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "obtaining," "generating," "calculating," "estimating," "using," "selecting," "accessing," and "determining" may be used interchangeably. For example, "obtaining," "generating," "calculating," "estimating," or "determining" a parameter (or a signal) may refer to actively generating, estimating, calculating, or determining the parameter (or the signal) or may refer to using, selecting, retrieving, receiving, or accessing the parameter (or signal) that is already generated, such as by another component or device.

Referring to FIG. 1, a particular illustrative aspect of a system 100 is depicted that includes a device 102 that is coupled to a display device 104 and that is configured to perform video decoding using a video decoder 124 with a configurable reference cache 152 and one or more memory buffers 156. For example, the device 102 is configured to use a memory configurer 190 to configure an on-chip memory 150 to adjust a size of the reference cache 152, to designate one or more portions of the on-chip memory 150 as the memory buffer(s) 156, or a combination thereof.

The device 102 includes a memory 110 coupled to one or more processors 116 and configured to store instructions 112 and video data. For example, the memory 110 may include encoded video data 122, adjusted pixels 130 corresponding to image portions of the encoded video data 122, or any combination thereof, as described in further detail below. In a particular implementation, the memory 110 corresponds to a dynamic random access memory (DRAM) of a double data rate (DDR) memory subsystem. It should be understood that an "image portion" can refer to a portion of a larger image frame or to an entire image frame.

The on-chip memory 150 is integrated directly into a processor chip or within the same package as the one or more processors 116. The on-chip memory 150 is generally characterized by its proximity to the one or more processors 116 (e.g., processor core(s)) enabling extremely fast access compared to off-chip memory (e.g., the memory 110). The on-chip memory 150 can include various types of caches, such as the reference cache 152. The reference cache 152 is typically used to store data that can be repeatedly accessed quickly during execution. For example, the reference cache 152 is configured to store data corresponding to decoded reference pixels that are to be used to reconstruct additional pixels.

The one or more processors 116 are configured to execute the instructions 112 to perform operations associated with configuring the on-chip memory 150 at the memory configurer 190, decoding encoded video data 122 at the video decoder 124, or both. In various implementations, some or all of the functionality associated with the memory configurer 190, the video decoder 124, or both, is performed via execution of the instructions 112 by the one or more processors 116, performed by processing circuitry of the one or more processors 116 in a hardware implementation, or a combination thereof.

The one or more processors 116 include the video decoder 124 coupled to an encoded data source 120. The video decoder 124 is also coupled to the on-chip memory 150 (e.g., an on-chip cache). The video decoder 124 is configured to obtain the encoded video data 122 from the encoded data source 120. For example, the encoded data source 120 may correspond to a portion of one or more of media files (e.g., a media file including the encoded video data 122 that is retrieved from the memory 110), a game engine, one or more other sources of video information, such as a remote media server, or a combination thereof.

In a particular implementation, the on-chip memory 150 and the video decoder 124 are integrated into a single substrate 196 (e.g., a single chip). Although the on-chip memory 150 is illustrated as distinct from and coupled to the video decoder 124, in other examples the on-chip memory 150 is integrated in the video decoder 124. According to an aspect, the on-chip memory 150 includes a static random access memory (SRAM).

The on-chip memory 150 includes a reference cache 152 configured to store decoded pixels of reference image portions that can be used as reference pixels to reconstruct additional pixels. The one or more processors 116 include the memory configurer 190 that is configured to adjust a size of the reference cache 152, and to add one or more memory buffer(s) 156 in the on-chip memory 150, as further described with reference to FIG. 2. For example, the memory configurer 190 determines, based on video coding information 192 (e.g., codec information, coding unit information, or both) of the video decoder 124, that the reference cache 152 is to have a reference cache size 172. In some implementations, the memory configurer 190 updates the reference cache size 172 in a register 170 to adjust the size of the reference cache 152, as further described with reference to FIG. 3. The memory configurer 190 also determines that the on-chip memory 150 includes a memory region 154 that is external to the reference cache 152, and designates one or more portions of the memory region 154 as one or more memory buffers 156 having corresponding one or more buffer sizes 182. The memory buffer(s) 156 are configured to buffer data (such as pixel data, line buffer data, streaming meta data, or any other type of data) associated with operation of the video decoder 124. The memory-buffer(s) 156 can reduce traffic to the memory 110 (e.g., DDR) by buffering data associated with pixel adjustment, data associated with other operations of the video decoder 124, or a combination thereof. In some implementations, the memory configurer 190 is configured to store, in a register 180, one or more address ranges 184 of the one or more portions of the memory region 154 to assign the one or more portions to the memory buffer(s) 156.

The video decoder 124 is configured to decode an image portion of the encoded video data 122 to generate first pixels, illustrated as reconstructed pixels 132 and to store the reconstructed pixels 132 in the memory buffer(s) 156 for display output. For example, the video decoder 124 may be configured to receive a first image portion 162 in the encoded video data 122 and to process the first image portion 162 to generate the reconstructed pixels 132.

The reconstructed pixels 132 may be output by the video decoder 124 to the on-chip memory 150 for storage in the memory buffer(s) 156 and later retrieval by a display unit 140 (e.g., a data processing unit (DPU)) for storage in a display memory 144 prior to output to a display device 104 as video data output 142. The display unit 140 is configured to receive the reconstructed pixels 132, to generate the video data output 142 based on the reconstructed pixels 132, and to provide the video data output 142, such as a display refresh, to the display device 104. To illustrate, the display unit 140 is configured to receive the reconstructed pixels 132 from the on-chip memory 150 and to store the reconstructed pixels 132 in the display memory 144. In some implementations, the display unit 140 may also retrieve additional data from the memory 110 for use in conjunction with processing the reconstructed pixels 132 (e.g., layer composition) to generate the video data output 142.

The display device 104 is configured to display the video data output 142, which is based on the reconstructed pixels 132. For example, the video data output 142 can include at least a portion of a reconstructed frame that is based on the reconstructed pixels 132 for viewing by a user of the device 102.

In some aspects, an image portion has dependence on one or more other image portions (e.g., surrounding image portions). For example, the video decoder 124 is configured to adjust the reconstructed pixels 132 of the first image portion 162 based on reconstructed pixels 134 of a second image portion 164 to generate adjusted pixels 130 of the first image portion 162. In a particular aspect, the video decoder 124 is configured to generate the adjusted pixels 130 concurrently with or subsequent to storing the reconstructed pixels 134 in the memory buffer(s) 156. The video decoder 124 is configured to store the adjusted pixels 130 in the reference cache 152, the memory 110, or both, so that the adjusted pixels 130 are available to be used as reference pixels to reconstruct additional pixels of other image portions.

Optionally, the video decoder 124 may be configured to selectively generate the adjusted pixels 130 and store the adjusted pixels 130 into the reference cache 152, the memory 110, or both, based on whether the adjusted pixels 130 correspond to reference pixels. To illustrate, the encoded video data 122 may include information that indicates which image portions are reference image portions, and the video decoder 124 may use the information to determine whether to generate and store the adjusted pixels 130 or refrain from generating the adjusted pixels 130. For example, the adjusted pixels 130 may be generated based on a determination that the first image portion 162 is a reference image portion, and generation and storage of non-reference image portions to the reference cache 152 and the memory 110 may be skipped. Skipping generation and storage of non-reference image portions enables memory access bandwidth, power consumption, and storage capacity of the memory 110 and the reference cache 152 that is used during decoding, to be reduced.

The device 102 optionally includes a modem 118 that is coupled to the one or more processors 116 and configured to enable communication with one or more other devices, such as via one or more wireless networks. According to some aspects, the modem 118 is configured to receive the encoded video data 122 from a second device, such as video data that is streamed via a wireless transmission 194 from a remote device 198 (e.g., a remote server) for playback at the device 102.

During operation, the memory configurer 190 configures the reference cache 152 to have a reference cache size 172 based on video coding information 192 (e.g., codec information, coding unit information, or both) of the video decoder 124, as further described with reference to FIGS. 2-3. For example, the memory configurer 190 determines the reference cache size 172 based on a recommended reference cache size for the video coding information 192. In some examples, the recommended reference cache size is associated with a target cache miss rate. In a particular aspect, the memory configurer 190 updates the register 170 to indicate the reference cache size 172 of the reference cache 152.

The memory configurer 190 assigns one or more portions of the memory region 154 to be used as memory buffer(s) 156 to buffer data associated with operation of the video decoder 124, as further described with reference to FIG. 2. For example, the memory configurer 190 identifies a memory region 154 of the on-chip memory 150 that is external to the reference cache 152. To illustrate, the memory configurer 190 determines a size of the memory region 154 (e.g., 512 kilobytes (KB)–40 KB=472 KB) based on a difference between a first size (e.g., 512 KB) of the on-chip memory 150 and the reference cache size 172 (e.g., 40 KB) of the reference cache 152. The memory configurer 190 assigns memory buffer(s) 156 from the memory region 154 of buffer size(s) 182 that fit within the size of the memory region 154 (e.g., 472 KB). In a particular aspect, the memory configurer 190 updates the register 180 to indicate the address range(s) 184, the buffer size(s) 182, or a combination thereof, of the memory buffer(s) 156. In some aspects, the memory configurer 190 configures the reference cache 152 and assigns the memory buffer(s) 156 during execution of the video decoder 124.

In a particular aspect, a default size (e.g., 512 KB) of the reference cache 152 can include all of the space available in the on-chip memory 150 and the default location of the memory buffer(s) 156 can be off-chip memory (e.g., the memory 110). For some codecs and coding unit sizes, the reference cache 152 is typically not fully utilized and the size of the reference cache 152 can be reduced with little or no adverse impact on performance. Configuring the reference cache 152 to have the reference cache size 172 (e.g., 40 KB) that is less than the default size (e.g., 512 KB) can enable space (e.g., the memory region 154) to become available in the on-chip memory 150 for the memory buffer(s) 156. A technical advantage of having the memory buffer(s) 156 on the on-chip memory 150 instead of on the off-chip memory includes reduction in traffic to the off-chip memory, thereby resulting in bandwidth savings and power savings.

The encoded video data 122 may be received at the video decoder 124 as a bitstream that includes a sequence of image portions including a first image portion 162, a second image portion 164, and one or more additional image portions including an Nth image portion 166 (N is a positive integer). The encoded video data 122 is processed by the video decoder 124 to generate reconstructed pixels for each of the image portions 162-166. For example, the video decoder 124 processes the first image portion 162 (e.g., the encoded version of the first image portion 162) to generate reconstructed pixels 132 of the first image portion 162. The video decoder 124 sends the reconstructed pixels 132 to the display memory 144. For example, the video decoder 124 stores the reconstructed pixels 132 into the memory buffer(s) 156, and the reconstructed pixels 132 are retrieved from the on-chip memory 150 and provided to the display unit 140 for output at the display device 104. In a particular aspect, the display unit 140 stores the reconstructed pixels 132 in the display memory 144, uses the reconstructed pixels 132 to generate video data output 142, and provides the video data output 142 to the display device 104.

The reconstructed pixels 132 may be generated at the video decoder 124 and transferred to the display unit 140 via the on-chip memory 150 without being stored at the memory 110. However, in some cases, such as based on the size of the memory buffer(s) 156 and a management policy used by the device 102, the reconstructed pixels 132 may be evicted from the on-chip memory 150 and stored into the memory 110. In such cases, in response to a request for the reconstructed pixels 132 resulting in a cache miss at the memory buffer(s) 156, the reconstructed pixels 132 may be retrieved from the memory 110 and provided to the display memory 144 of the display unit 140. The display unit 140 generates the video data output 142 based on the reconstructed pixels 132 and provides the video data output 142 to the display device 104 for playout, such as to a user of the device 102. In a particular aspect, the video decoder 124 sends the reconstructed pixels 132 to the display memory 144 independently of dependency on later-reconstructed image portions. The reconstructed pixels 132 are thus sent to the display memory 144 prior to any adjustment of the reconstructed pixels 132 based on later-reconstructed image portions.

Storage of the reconstructed pixels 132 at the on-chip memory 150 enables the reconstructed pixels 132 to be conveyed from the video decoder 124 to the display unit 140 without being stored into, and later retrieved from, the memory 110. As a result, usage of the storage capacity of the memory 110, memory bandwidth associated with data transfer into and out of the memory 110, and power consumption associated with the memory 110 are reduced as compared to storing the reconstructed pixels 132 into the memory 110 and later reading the reconstructed pixels 132 from the memory 110.

In a particular implementation, the video decoder 124, in response to determining that the reconstructed pixels 132 do not have a dependency on later-reconstructed pixels and determining that the reconstructed pixels 132 correspond to reference pixels that are to be used to generate other reconstructed pixels, stores the reconstructed pixels 132 of the first image portion 162 in the reference cache 152. Alternatively, the video decoder 124, in response to determining that the reconstructed pixels 132 have a dependency on later-reconstructed pixels (e.g., of surrounding image portions), refrains from storing the reconstructed pixels 132 in the reference cache 152.

The video decoder 124 processes additional image portions of the encoded video data 122 to generate additional reconstructed pixels. For example, the video decoder 124 processes the second image portion 164 (e.g., the encoded version of the second image portion 164) to generate reconstructed pixels 134 of the second image portion 164.

The video decoder 124, in response to determining that the reconstructed pixels 132 of the first image portion 162 have a dependency on later-reconstructed image portions and that the later-reconstructed image portions are available, adjusts the reconstructed pixels 132 based on the later-reconstructed image portions to generate adjusted pixels 130 of the first image portion 162 for use as reference pixels, as further described with reference to FIGS. 4 and 6. For example, the video decoder 124, in response to determining that the reconstructed pixels 132 of the first image portion 162 have a dependency on at least the reconstructed pixels 134 of the second image portion 164, adjusts the reconstructed pixels 132 based at least in part on the reconstructed pixels 134 to generate the adjusted pixels 130 of the first image portion 162 for use as reference pixels. To illustrate, the video decoder 124, in response to determining that first boundary pixels of the reconstructed pixels 132 are adjacent to second boundary pixels of the reconstructed pixels 134, generates adjusted boundary pixels (e.g., the adjusted pixels 130) that are based on the first boundary pixels and the second boundary pixels (e.g., using a deblocking filter operation). The reconstructed pixels 132 thus are adjusted subsequent to sending the reconstructed pixels 132 to the display memory 144 and subsequent to generating the reconstructed pixels 134.

The video decoder 124, in response to determining that the first image portion 162 corresponds to a reference image portion that is to be used to reconstruct additional image portions, stores the adjusted pixels 130 of the first image portion 162 in the reference cache 152, the memory 110, or both, as further described with reference to FIG. 4. In a particular aspect, determining that the first image portion 162 corresponds to a reference image portion is equivalent to determining that the reconstructed pixels 132, the adjusted pixels 130, or both, correspond to reference pixels.

The video decoder 124 processes one or more additional image portions of the encoded video data 122 based on the adjusted pixels 130 to generate additional reconstructed pixels. For example, the video decoder 124 retrieves the adjusted pixels 130 from the reference cache 152 or the memory 110, and uses intra-frame prediction or inter-frame prediction based on the adjusted pixels 130 of the first image portion 162 to generate reconstructed pixels 136 of the Nth image portion 166. Generating the reconstructed pixels 136 based on the adjusted pixels 130, instead of the reconstructed pixels 132, may result in the reconstructed pixels 136 corresponding to a more accurate representation of the Nth image portion 166.

The adjusted pixels 130 may be generated at the video decoder 124, stored at the reference cache 152 of the on-chip memory 150, and used to generate the reconstructed pixels 136 without being stored at the memory 110. However, in some cases, such as based on the size of the on-chip memory 150 and a management policy used by the device 102, the adjusted pixels 130 may be evicted from the on-chip memory 150 and stored into the memory 110. In such cases, in response to a request for the adjusted pixels 130 resulting in a cache miss at the reference cache 152, the adjusted pixels 130 may be retrieved from the memory 110 and provided to the video decoder 124. The video decoder 124 generates the reconstructed pixels 136 based on the adjusted pixels 130.

A technical advantage of sending the reconstructed pixels 132 from the memory buffer(s) 156 to the display memory 144 prior to adjustment of the reconstructed pixels 132 based on dependency on later-constructed image portions can include reduced latency associated with displaying a representation of the first image portion 162. For example, the reconstructed pixels 132 can be provided to the display unit 140 prior to or concurrently with generating the reconstructed pixels 134. A technical advantage of using the adjusted pixels 130, instead of the reconstructed pixels 132, to generate the reconstructed pixels 136 can include improved reconstruction accuracy.

Figure 8:
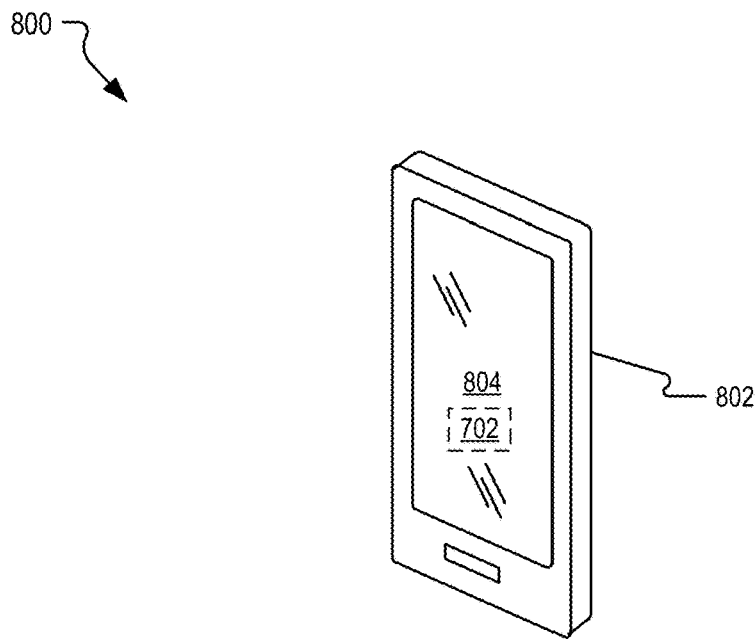
FIG. 8 is a diagram of an implementation of a portable electronic device operable to perform video decoding using a video decoder with a configurable reference cache and on-chip memory buffer, in accordance with some examples of the present disclosure.
Figure 9:
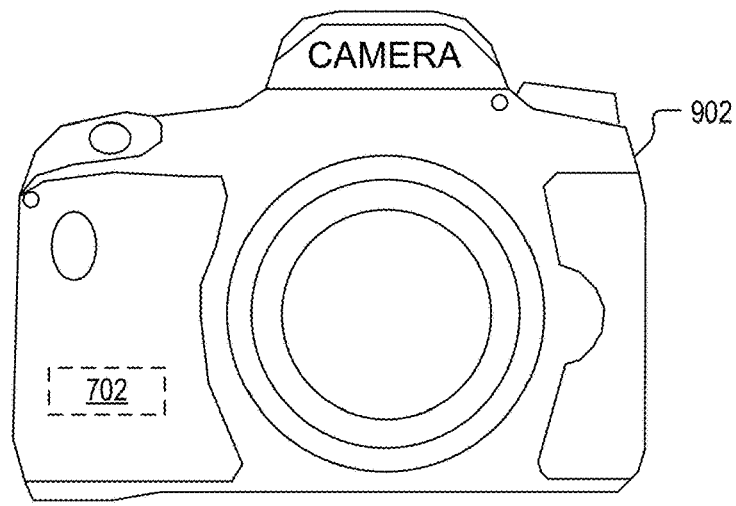
FIG. 9 is a diagram of a camera operable to perform video decoding using a video decoder with a configurable reference cache and on-chip memory buffer, in accordance with some examples of the present disclosure.
Figure 10:
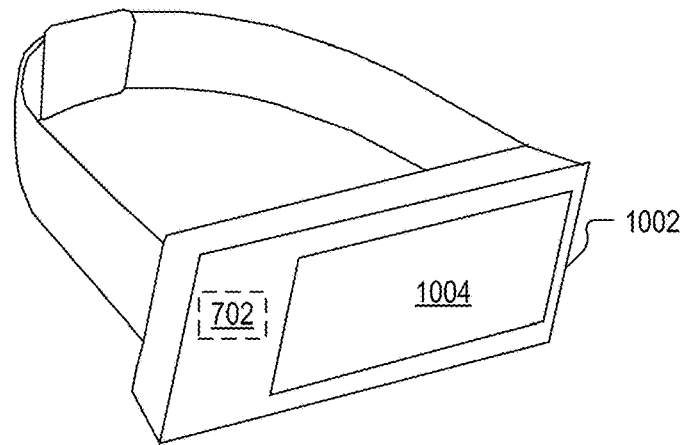
FIG. 10 is a diagram of a wearable electronic device operable to perform video decoding using a video decoder with a configurable reference cache and on-chip memory buffer, in accordance with some examples of the present disclosure.
Figure 11:
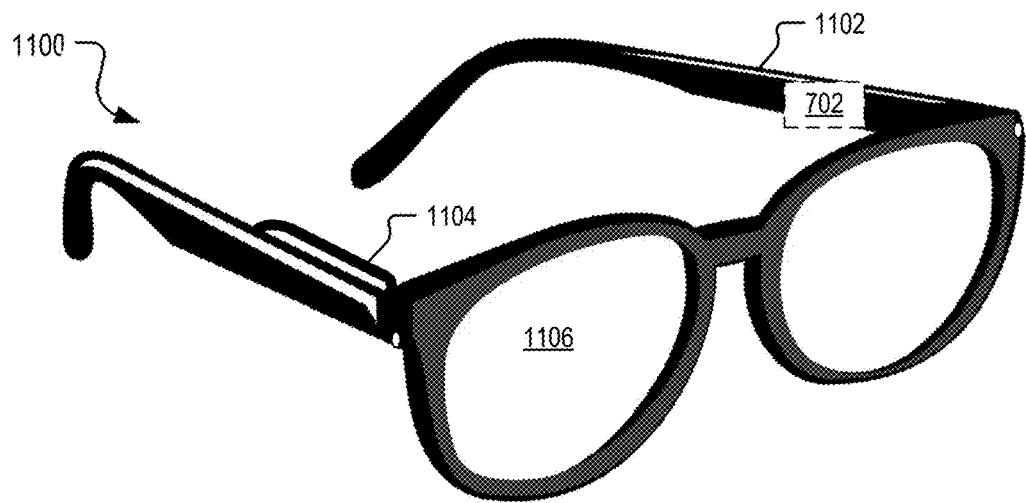
FIG. 11 is a diagram of an extended reality device, such as augmented reality glasses, operable to perform video decoding using a video decoder with a configurable reference cache and on-chip memory buffer, in accordance with some examples of the present disclosure.
Figure 12:
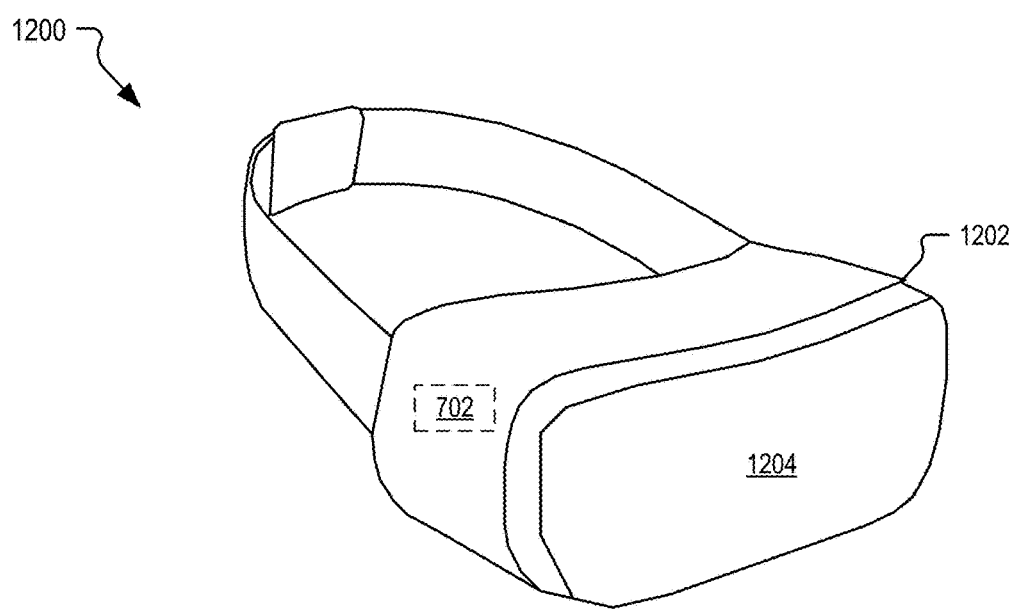
FIG. 12 is a diagram of a headset, such as a virtual reality, mixed reality, or augmented reality headset, operable to perform video decoding using a video decoder with a configurable reference cache and on-chip memory buffer, in accordance with some examples of the present disclosure.
Figure 13:
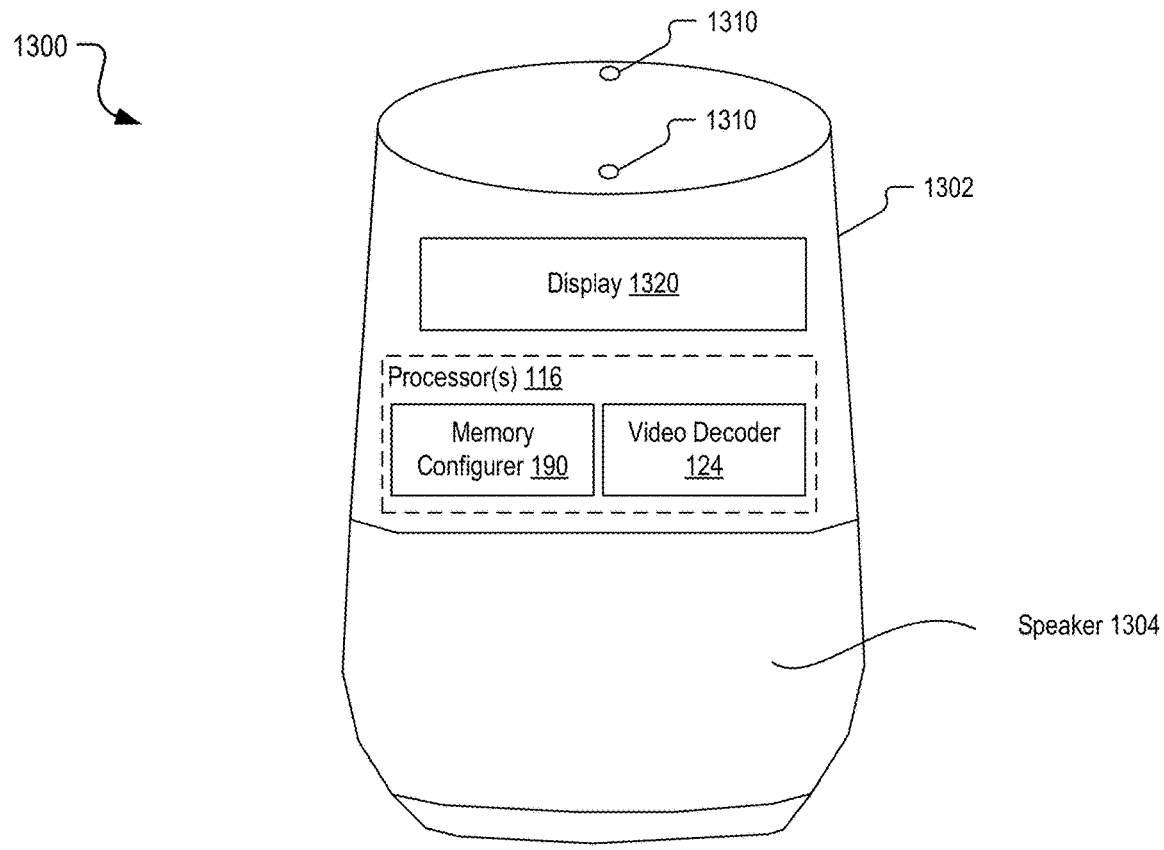
FIG. 13 is a diagram of a voice-controlled speaker system operable to perform video decoding using a video decoder with a configurable reference cache and on-chip memory buffer, in accordance with some examples of the present disclosure.
Figure 14:
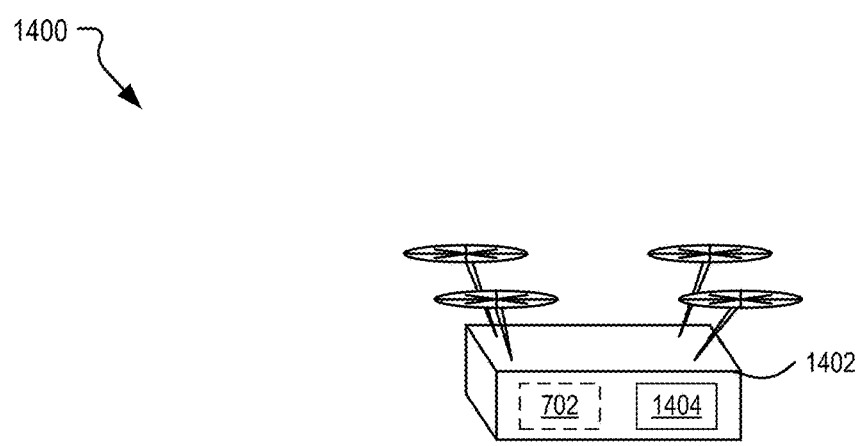
FIG. 14 is a diagram of a first example of a vehicle operable to perform video decoding using a video decoder with a configurable reference cache and on-chip memory buffer, in accordance with some examples of the present disclosure.
Figure 15:
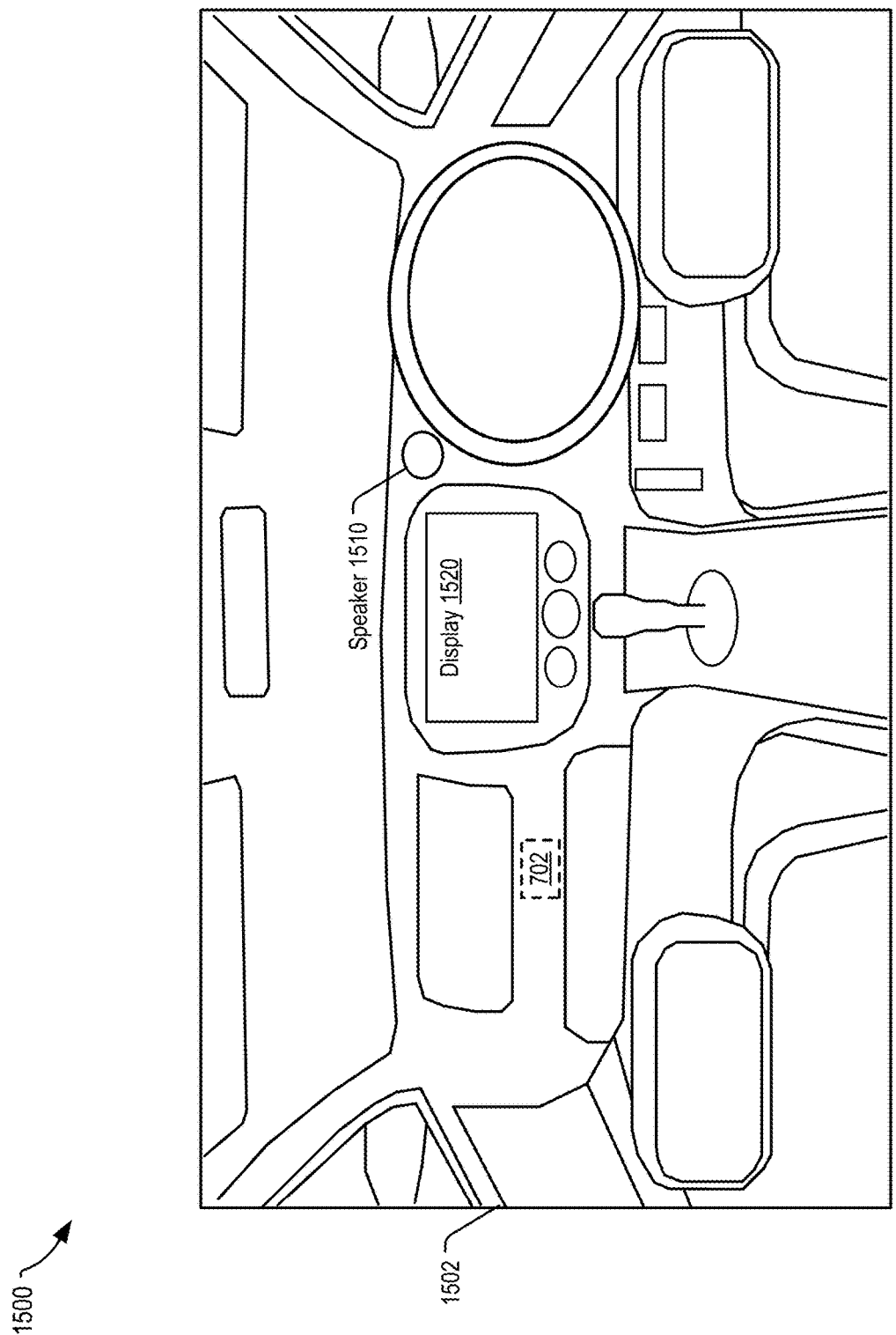
FIG. 15 is a diagram of a second example of a vehicle operable to perform video decoding using a video decoder with a configurable reference cache and on-chip memory buffer, in accordance with some examples of the present disclosure.

According to some aspects, the one or more processors 116 are integrated in at least one of a mobile phone or a tablet computer device, such as illustrated in FIG. 8, or a wearable electronic device, such as illustrated in FIG. 10. According to some aspects, the one or more processors 116 are integrated in a camera device, such as illustrated in FIG. 9, or a voice-controlled speaker system, such as illustrated in FIG. 13. According to some aspects, the one or more processors 116 are integrated in an extended reality headset device that is configured to display an output based on the reconstructed pixels 132, such as illustrated in FIG. 11 and FIG. 12. According to some aspects, the one or more processors 116 are integrated in a vehicle that also includes a display device configured to display an output based on the reconstructed pixels 132, such as illustrated in FIG. 14 and FIG. 15.

Although the display device 104 is illustrated as included in (e.g., integrated with) the device 102, in other implementations the display device 104 may be coupled to, but not included in, the device 102. Although the modem 118 is illustrated as included in the device 102, in other examples the modem 118 may be omitted.

Figure 2:
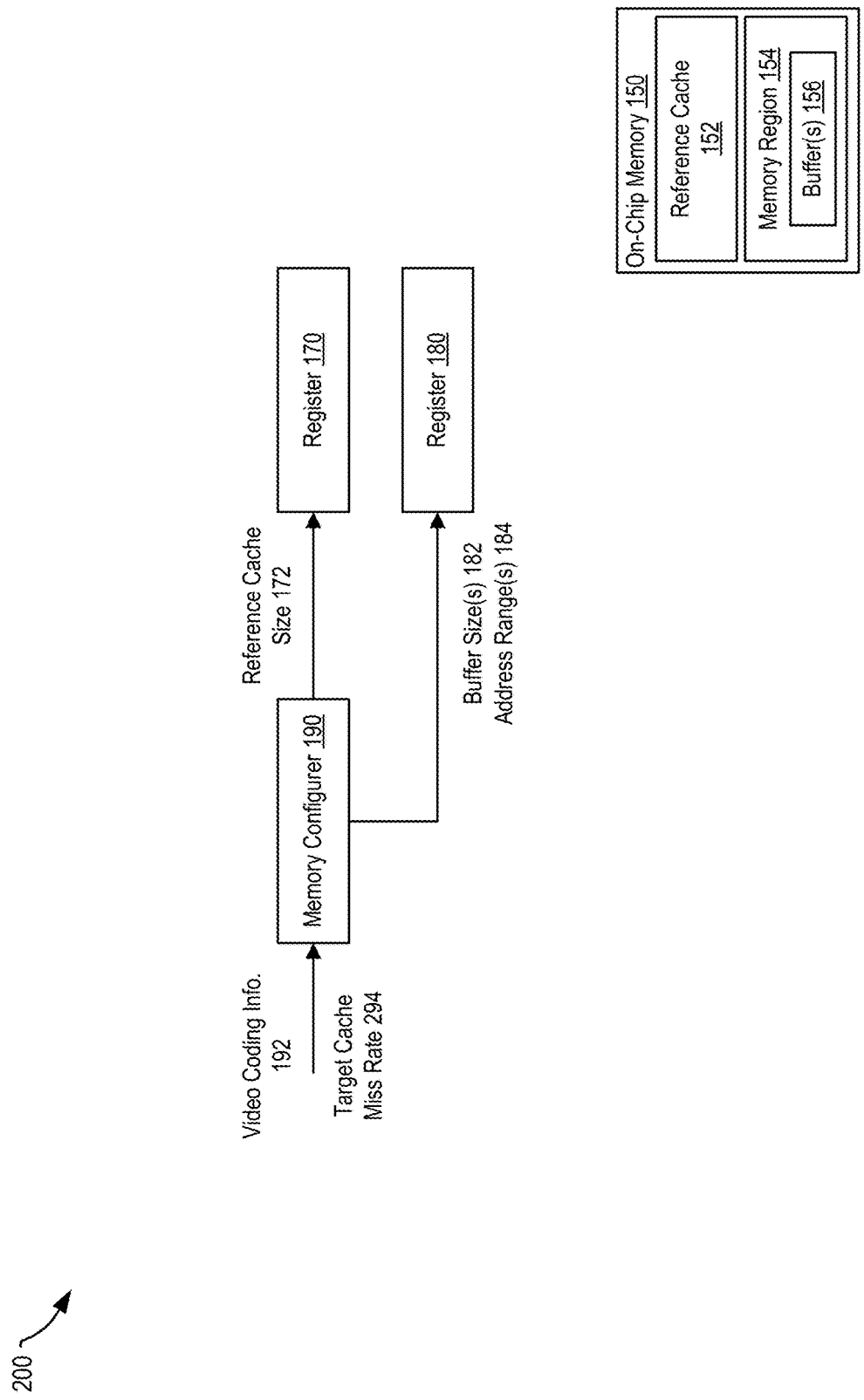
FIG. 2 is a block diagram illustrating an example of components of the system of FIG. 1, in accordance with some examples of the present disclosure.

FIG. 2 depicts an illustrative example 200 including components of the system 100 of FIG. 1, in accordance with some examples of the present disclosure. To illustrate, the example 200 illustrates the memory configurer 190 coupled to the register 170 and the register 180.

The memory configurer 190 is configured to adjust a size of the reference cache 152 and to designate the memory buffer(s) 156 in the on-chip memory 150. For example, the memory configurer 190 determines the reference cache size 172 based on the video coding information 192 (e.g., codec information, coding unit information, or both). The video decoder 124 is configured to support different reference cache sizes for different combinations of codecs and coding unit sizes.

In a particular implementation, the memory configurer 190 has access to cache size mapping data that maps codecs (e.g., H264, H265, AV1, VVC, etc.), coding unit sizes (e.g., 16×16, 32×32, 64×64, 128×128 pixels, etc.), or a combination thereof, to recommended reference cache sizes (e.g., 40 KB, 60 KB, 80 KB, 120 KB, 140 KB, and so on) that are supported by the video decoder 124.

Table 1 provides illustrative, non-limiting examples of recommended reference cache sizes corresponding to codecs and coding unit sizes.

TABLE 1

| Codec | Coding Unit Size | Recommended Reference Cache Size (KB) | Memory Region Size (KB) |
|---|---|---|---|
| H264 | 16 × 16 | 40 | 472 |
| H265 | 32 × 32 | 60 | 452 |
| H265/VP9/AV1/VVC | 64 × 64 | 80 | 432 |
| AV1 | 128 × 128 | 120 | 392 |
| VVC | 128 × 128 | 140 | 372 |

As shown in Table 1, for a H264 codec with a 16×16 coding unit size, the recommended reference cache size is 40 KB with 472 KB remaining in a 512 KB on-chip memory for allocation as the memory buffer(s) 156. Table 1 provides illustrative, non-limiting examples of recommended reference cache sizes for some codecs and coding unit sizes. In other examples, the memory configurer 190 can support different reference cache sizes for different combinations of codecs and coding unit sizes. For example, the cache size mapping data can include mappings for one or more different codecs in addition to, or as an alternative to, the codecs listed in Table 1. The total size of "recommended reference cache size" plus "memory region size" of 512 KB is also provided as an illustrative non-limiting example. In other examples, the total size can be more than 512 KB or less than 512 KB.

In a particular aspect, the recommended reference cache sizes are associated with a target cache miss rate. For example, the memory configurer 190 has access to first cache size mapping data that maps video coding information (e.g., codecs, coding unit sizes, or a combination thereof) to first recommended reference cache sizes that are expected to satisfy a first target cache miss rate. As another example, the memory configurer 190 has access to second cache size mapping data that maps video coding information (e.g., codecs, coding unit sizes, or a combination thereof) to second recommended reference cache sizes that are expected to satisfy a second target cache miss rate. In this aspect, the memory configurer 190 selects cache size mapping data corresponding to a target cache miss rate 294 and uses the selected cache size mapping data to determine the reference cache size 172 that is expected to satisfy the target cache miss rate 294. In a particular aspect, the target cache miss rate 294 is based on a configuration setting, default data, user input, or a combination thereof.

The memory configurer 190, in response to determining that cache size mapping data indicates that the video coding information 192 of the video decoder 124 maps to a recommended reference cache size (e.g., 40 KB), determines the reference cache size 172 based on the recommended reference cache size.

The memory configurer 190 determines, based on a difference between a size (e.g., 512 KB) of the on-chip memory 150 and the reference cache size 172 (e.g., 40 KB) that the on-chip memory 150 includes a memory region 154 (e.g., 512 KB−40 KB=472 KB) that is external to the reference cache 152. In a particular aspect, the memory configurer 190 assigns one or more portions of the memory region 154 as the memory buffer(s) 156 to buffer data associated with operation of the video decoder 124. In some aspects, the memory configurer 190 has access to traffic mapping data that indicates bandwidth savings, power savings, or a combination thereof, associated with sizes of memory buffers in the on-chip memory 150 for different types of traffic to the memory 110 associated with operation of the video decoder 124.

Table 2 provides illustrative, non-limiting examples of recommended on-chip memory buffer sizes corresponding to traffic types, and associated bandwidth and power savings.

TABLE 2

| Traffic Type | On-Chip Memory Buffer Size (Kilobytes) | Bandwidth Savings (Megabytes/second) | Power Savings (milliWatts) |
|---|---|---|---|
| 8K30 AV1D TLB | 256 | 256 | 64 |
| 8K30 H265d TLB | 256 | 200 | 20 |
| 8K30 VVCd TLB | 256 | 156 | 10 |
| 8K30 H265e TLB | 256 | 156 | 10 |
| 4K60 H265d ROI Reference | 512 | 265 | 66 |

As shown in Table 2, a top line buffer (TLB) in the on-chip memory 150 to store data for 8K30 AV1D with a size of 256 KB is expected to result in 256 megabytes/second (MB/s) of bandwidth savings and 64 milliWatts (mW) of power savings. Table 2 provides illustrative, non-limiting examples of bandwidth savings and power savings for some traffic types. In other examples, buffers in the on-chip memory 150 for various types of traffic can result in different combinations of bandwidth savings and power savings. To illustrate, non-limiting illustrative examples of buffers for various types of traffic can include a line buffer (e.g., top line buffer, left line buffer, or prediction unit buffer), a bitstream buffer, a video slice and tile buffer, a bin header and coefficient stream buffer, a collocated motion vector buffer, a coder control buffer, a film grain data buffer, or a combination thereof.

The memory configurer 190, based on a size (e.g., 472 KB) of the memory region 154 and traffic type at the device 102, allocates buffers for traffic types that would satisfy a first buffer allocation criterion. The first buffer allocation criterion can include allocating a memory buffer that has a recommended buffer size that corresponds to highest expected bandwidth savings, highest expected power savings, highest read and write latency reduction, or a highest combination of expected savings among recommended buffer sizes that fit within an available portion of the memory region 154. In an example, the memory configurer 190, in response to determining that a TLB to store data for 8K30 AV1D with a size of 256 KB is expected to result in bandwidth savings (e.g., 256 MB/s) and power savings (e.g., 64 mW) that are highest for a recommended buffer size that would fit in the memory region 154, allocates a first memory buffer 156 to store data for 8K30 AV1D having a first buffer size 182 that is based on a recommended buffer size (e.g., 256 KB).

The memory configurer 190 determines that after allocating the first buffer size 182 to the first memory buffer 156, there is a remaining portion of the memory region 154 based on a difference between the size of the memory region 154 and the allocated buffer size(s) 182 (e.g., 472 KB–256 KB=216 KB). In some implementations, the remaining portion of the memory region 154 remains unallocated. In some implementations, at least some of the remaining portion of the memory region 154 is added to the reference cache 152 so the reference cache size 172 is updated (e.g., to 40 KB+216 KB=256 KB).

In some implementations, at least some of the remaining portion of the memory region 154 is assigned to a second memory buffer 156 to store data of a second traffic type (e.g., 4K60 H265d region-of-interest (ROI) of Reference) although the remaining portion (e.g., 216 KB) of the memory region 154 is less than the recommended on-chip memory buffer size (e.g., 512 KB) for the second traffic type. To illustrate, a second buffer size 182 (e.g., less than or equal to 216 KB) of the second memory buffer 156 is less than the recommended on-chip memory buffer size (e.g., 512 KB) for the second traffic type. In some aspects, the memory configurer 190 allocates the remaining portion of the memory region 154 as a second memory buffer 156 to store data of a second traffic type that satisfies a second buffer allocation criterion. In a first example, the second buffer allocation criterion can include allocating a memory buffer that has a recommended buffer size that corresponds to highest expected bandwidth savings, highest expected power savings, highest read and write latency saving, or a highest combination of expected savings among unallocated buffers for traffic types at the device 102. In the first example, the second buffer allocation criterion is independent of the recommended buffer size. In a second example, the second buffer allocation criterion can include allocating a memory buffer that has a recommended buffer size that corresponds to highest expected bandwidth savings, highest expected power savings, highest read and write latency saving, or a highest combination of expected savings among unallocated buffers for traffic types at the device 102 that have a recommended buffer size (e.g., 256 KB) that is closest to the size (e.g., 216 KB) of the remaining portion of the memory region 154.

In a particular embodiment, the memory configurer 190 stores an indication of the reference cache size 172 in the register 170. In some implementations, the memory configurer 190 stores data indicating one or more address ranges of the on-chip memory 150 in the register 170. One or more portions of the on-chip memory corresponding to the address range(s) are allocated to the reference cache 152.

In a particular embodiment, the memory configurer 190 stores data indicating buffer size(s) 182 and address range(s) 184 of the memory buffer(s) 156 in the register 180. For example, the memory configurer 190 stores, in the register 180, data indicating the first buffer size (e.g., 256 KB) of the first memory buffer 156 and one or more first address range(s) of the memory region 154 allocated to the first memory buffer 156. In a particular aspect, the memory configurer 190 also stores, in the register 180, data indicating that the first memory buffer 156 is allocated to store data of the first traffic type. As another example, the memory configurer 190 stores, in the register 180, data indicating the second buffer size (e.g., 216 KB) of the second memory buffer 156 and one or more second address range(s) of the memory region 154 allocated to the second memory buffer 156. In a particular aspect, the memory configurer 190 also stores, in the register 180, data indicating that the second memory buffer 156 is allocated to store data of the second traffic type.

It should be understood that the memory configurer 190 updating two registers (e.g., the register 170 and the register 180) to update the reference cache size 172 and to allocate the memory buffer(s) 156 is provided as an illustrative example. In other implementations, the memory configurer 190 may use other techniques to update the reference cache size 172, to allocate the memory buffer(s) 156, or both. For example, the memory configurer 190 can update a single combined register to update the reference cache size 172, to allocate the memory buffer(s) 156, both. In another example, the memory configurer 190 can update three or more registers to update the reference cache size 172, to allocate the memory buffer(s) 156, both.

Figure 3:
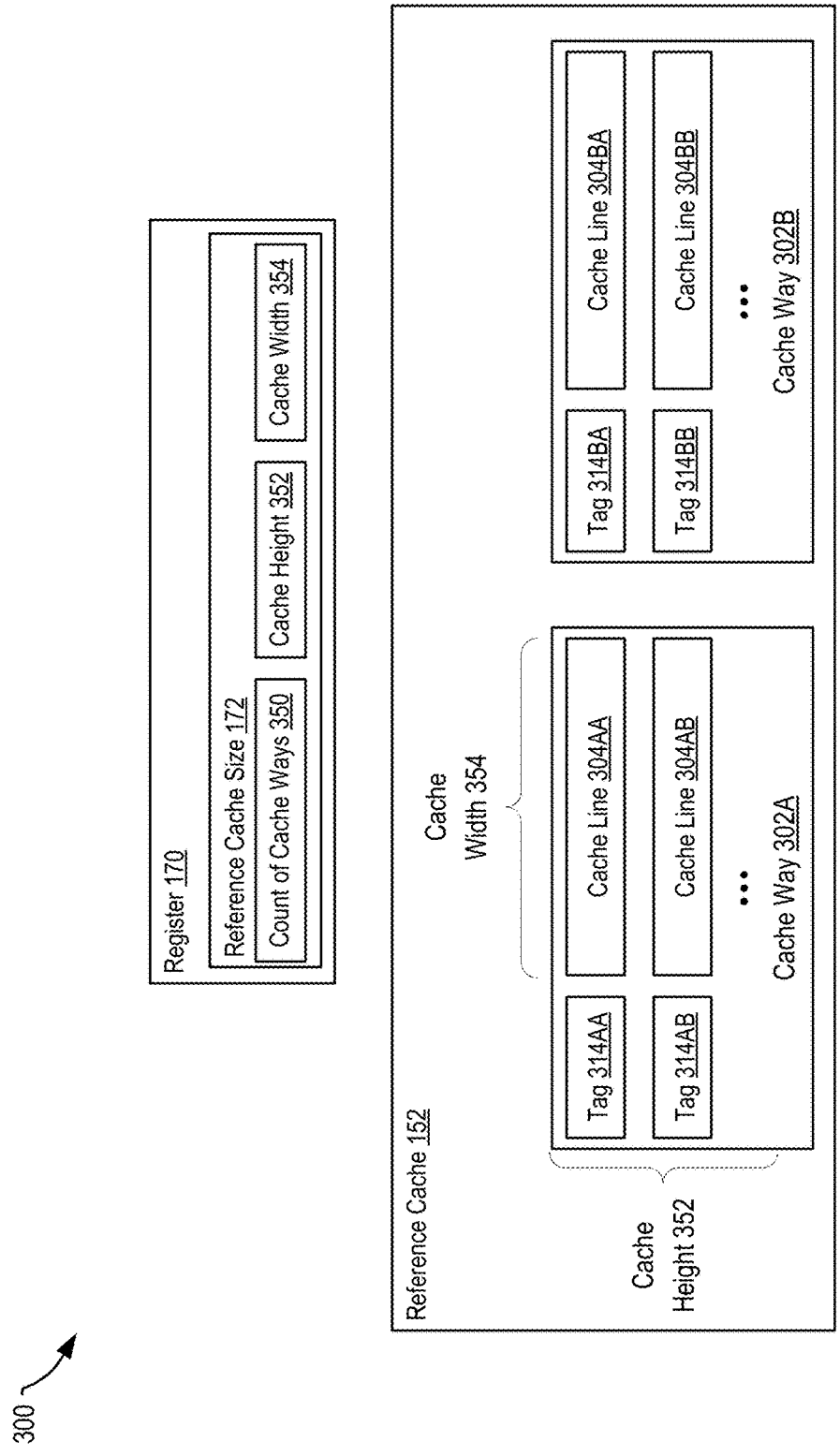
FIG. 3 is a block diagram illustrating an example of a configured reference cache that can be implemented in the system of FIG. 1, in accordance with some examples of the present disclosure.

FIG. 3 depicts an illustrative example 300 of a configured reference cache 152 that can be implemented in the system 100 of FIG. 1, in accordance with some examples of the present disclosure.

The memory configurer 190 of FIG. 1 configures, during execution of the video decoder 124, the reference cache 152 to have the reference cache size 172. In the example 300, the memory configurer 190 updates the register 170 to indicate a count of cache ways 350, a cache height 352, a cache width 354, or a combination thereof, of the reference cache 152 for the reference cache 152 to have the reference cache size 172.

In an example, the on-chip memory 150 includes a plurality of memory units (e.g., bytes). A count of memory units allocated to the reference cache 152 corresponds to the count of cache ways 350, the cache height 352, the cache width 354, or a combination thereof (e.g., count of memory units=count of cache ways 350×the cache height 352×the cache width 354).

The memory configurer 190 designates sets of memory units (e.g., bytes) as a plurality of cache lines 304. For example, each cache line 304 corresponds to a particular count of memory units corresponding to the cache width 354.

The memory configurer 190 designates sets of cache lines 304 as cache ways 302 corresponding to the count of cache ways 350. In an illustrative example, the count of cache ways 350 indicates 2 cache ways and the reference cache 152 includes a cache way 302A and a cache way 302B. In other examples, the reference cache 152 can include fewer than 2 or more than 2 cache ways corresponding to the count of cache ways 350. Each cache way 302 corresponds to a particular count of cache lines 304 corresponding to the cache height 352. For example, the cache way 302A includes cache lines 304A, such as a cache line 304AA, a cache line 304AB, and so on. A count of the cache lines 304A is based on the cache height 352. As another example, the cache way 302B includes cache lines 304B, such as a cache line 304BA, a cache line 304BB, and so on. A count of the cache lines 304B is based on the cache height 352.

In a particular aspect, the memory configurer 190 assigns a plurality of tags 314 to the plurality of cache lines 304. For example, each cache line 304 is associated with a respective tag 314. To illustrate, the cache line 304AA, the cache line 304AB, the cache line 304BA, and the cache line 304BB are associated with a tag 314AA, a tag 314AB, a tag 314BA, and a tag 314BB, respectively.

Although illustrated as a 2-way cache, in other implementations the reference cache 152 may have one or more other configurations. To illustrate, the reference cache 152 may be configured as a single-way cache having a cache width 354 that is based on (e.g., matches) a coding unit size, as an illustrative, non-limiting example. In some optional examples, the tags 314 may be omitted.

Figure 4:
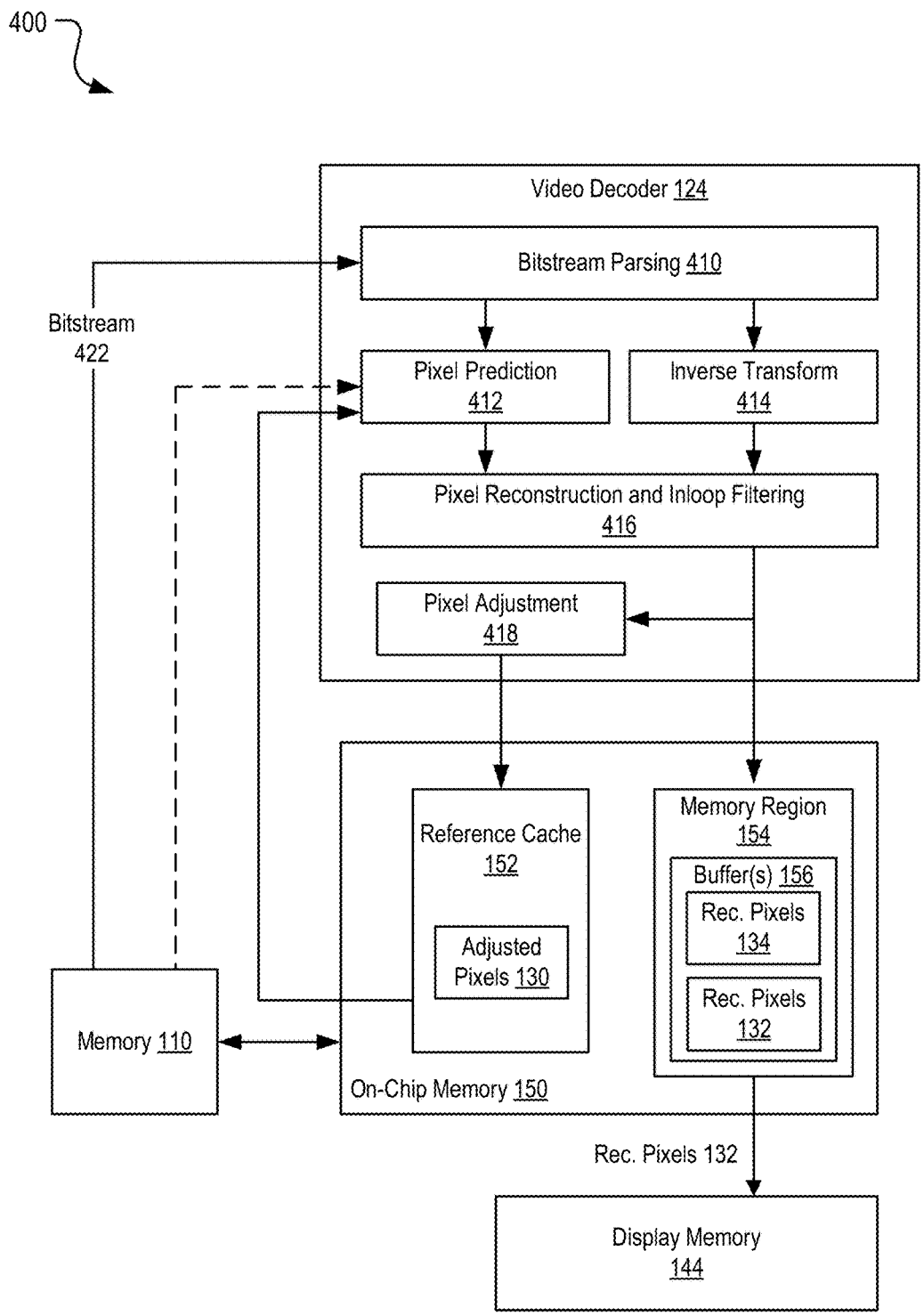
FIG. 4 is a diagram illustrating an example of components of a video decoder that can be implemented in the system of FIG. 1, in accordance with some examples of the present disclosure.

FIG. 4 depicts an illustrative example 400 including components that may be implemented in the video decoder 124, in accordance with some examples of the present disclosure. In the example 400, the video decoder 124 includes a bitstream parsing unit 410, a pixel prediction processing unit 412, an inverse transform processing unit 414, a pixel reconstruction and inloop filtering unit 416, and a pixel adjustment unit 418. In a particular implementation, the bitstream parsing unit 410, the pixel prediction processing unit 412, the inverse transform processing unit 414, the pixel reconstruction and inloop filtering unit 416, the pixel adjustment unit 418, or any combination thereof, may be implemented in one or more processors or in processing circuitry.

The various units shown in FIG. 4 are illustrated to assist with understanding the operations performed by the video decoder 124 in accordance with some implementations. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

In general, the video decoder 124 reconstructs a picture on a portion-by-portion basis. The video decoder 124 may perform a reconstruction operation on each image portion individually (where the image portion currently being reconstructed, i.e., decoded, may be referred to as a "current image portion").

The bitstream parsing unit 410 receives encoded video data 122 and may entropy decode the encoded video data 122 to reproduce syntax elements. The pixel prediction processing unit 412, inverse transform processing unit 414, and the pixel reconstruction and inloop filtering unit 416 may generate decoded video data based on the syntax elements extracted from the bitstream 422. In some implementations, the bitstream parsing unit 410 may decode information indicating which image portions in the bitstream 422 are reference image portions, which the video decoder 124 may use to determine which decoded image portions to store into the reference cache 152.

The bitstream parsing unit 410 may entropy decode syntax elements defining quantized transform coefficients of a quantized transform coefficient image portion, as well as transform information, such as a quantization parameter (QP) and/or transform mode indication(s). The QP associated with the quantized transform coefficient image portion may be used to determine a degree of quantization and a degree of inverse quantization to apply. In an example, a bitwise left-shift operation may be performed to inverse quantize the quantized transform coefficients, and a transform coefficient image portion including transform coefficients may be formed.

The pixel prediction processing unit 412 may include one or more units to perform prediction in accordance with one or more prediction modes. As examples, the pixel prediction processing unit 412 may include a motion compensation unit, an inter-prediction unit, an intra-prediction unit, a palette unit, an affine unit, a linear model (LM) unit, one or more other units configured to prediction, or a combination thereof.

In addition, the pixel prediction processing unit 412 generates a prediction image portion according to prediction information syntax elements that were entropy decoded by the bitstream parsing unit 410. For example, if the prediction information syntax elements indicate that the current image portion is inter-predicted, a motion compensation unit (not shown) may generate the prediction image portion. In this case, the prediction information syntax elements may indicate a reference image portion (e.g., reconstructed pixels or adjusted pixels of the reference image portion) to be retrieved from the reference cache 152, as well as a motion vector identifying a location of the reference image portion in a reference image relative to the location of the current image portion in a current image. In some aspects, the reference image portion (e.g., the reconstructed pixels or the adjusted pixels of the reference image portion) may have been evicted from the reference cache 152 and may retrieved from the memory 110.

As another example, if the prediction information syntax elements indicate that the current image portion is intra-predicted, an intra-prediction unit (not shown) may generate the prediction image portion according to an intra-prediction mode indicated by the prediction information syntax elements. The pixel prediction processing unit 412 may retrieve data of neighboring samples (e.g., reconstructed pixels or adjusted pixels of neighboring image portions) to the current image block from the reference cache 152. In some aspects, the neighboring image portions (e.g., the reconstructed pixels or the adjusted pixels of the neighboring image portions) may have been evicted from the reference cache 152 and may retrieved from the memory 110.

The pixel prediction processing unit 412 may also determine to decode image portions of video data using an intra block copy (IBC) mode. In general, in IBC mode, the video decoder 124 may determine predictive image portions for a current image portion, where the predictive image portions are in the same frame as the current image portion. The predictive image portions may be identified by an image portion vector (e.g., a motion vector) and limited to the locations of image portions that have already been decoded.

The inverse transform processing unit 414 may apply one or more inverse transforms to the transform coefficient image portion from the bitstream parsing unit 410 to generate a residual image portion associated with the current image portion. For example, the inverse transform processing unit 414 may apply an inverse discrete cosine transform (DCT), an inverse integer transform, an inverse Karhunen-Loeve transform (KLT), an inverse rotational transform, an inverse directional transform, or another inverse transform to the coefficient image portion.

The pixel reconstruction and inloop filtering unit 416 may reconstruct the current image portion using the prediction image portion and the residual image portion. For example, the pixel reconstruction and inloop filtering unit 416 may add samples of the residual image portion to corresponding samples of the prediction image portion to reconstruct the current image portion.

In some implementations, the pixel reconstruction and inloop filtering unit 416 may perform one or more filter operations on reconstructed image portions. For example, the pixel reconstruction and inloop filtering unit 416 may access reconstructed pixels of image portions and perform deblocking operations to generate adjusted pixels with reduced blockiness artifacts along edges. Operations of the pixel reconstruction and inloop filtering unit 416 are not necessarily performed in all examples.

The video decoder 124 may store the reconstructed pixels of the image portions in the memory buffer(s) 156 on the on-chip memory 150, the off-chip memory 110, or both, for larger storage capacity. The memory buffer(s) 156 generally store reconstructed pixels of image portions, illustrated as reconstructed pixels 132 and reconstructed pixels 134, which the video decoder 124 may output to the display memory 144. The video decoder 124 may store reconstructed pixels of reference image portions that do not have dependence on later-reconstructed image portions in the reference cache 152, which the video decoder 124 may use as reference video data when decoding subsequent data or image portions of the encoded video bitstream.

The pixel adjustment unit 418 is configured to process reconstructed pixels of image portions that have dependence on later-reconstructed image portions to generate adjusted pixels. For example, the pixel adjustment unit 418, based on determining that the first image portion 162 has a dependence on one or more image portions (e.g., the second image portion 164), retrieves the reconstructed pixels 132 of the first image portion 162 and the reconstructed pixels (e.g., the reconstructed pixels 134) of the one or more image portions, and generates adjusted pixels 130 based on the retrieved reconstructed pixels 132 and 134. In a particular implementation, the pixel adjustment unit 418 applies an image filter to adjust the reconstructed pixels 132 based on the reconstructed pixels 134 to generate the adjusted pixels 130. The image filter includes at least one of a deblocking filter, a sample adaptive offset filter, an adaptive loop filter, a cross-component adaptive loop filter, or a luma mapping filter. Sending the reconstructed pixels 132 to the display memory 144 prior to applying the image filter reduces a latency associated with displaying a representation of the first image portion 162. In some implementations, the pixel adjustment unit 418 can be included in the pixel reconstruction and inloop filtering unit 416. In some implementations, some of the functionality described with reference to the pixel reconstruction and inloop filtering unit 416 can be performed in the pixel adjustment unit 418.

The video decoder 124 may store the adjusted pixels of a reference image portion, illustrated as the adjusted pixels 130, in the reference cache 152, which the video decoder 124 may use as reference video data when decoding subsequent data or image portions of the encoded video bitstream. In a particular implementation, the pixel adjustment unit 418 generates adjusted pixels of reference image portions that have dependence on later-reconstructed image portions, and refrains from generating adjusted pixels of image portions that are non-reference image portions independently of whether the image portions have dependence on later-reconstructed image portions. A technical advantage of selectively adjusting the reconstructed pixels for reference image portions that have dependence includes reduced resource usage (e.g., memory, computation cycles, or both).

As discussed above, the reference cache 152 may provide reference information, such as samples of a current image portion for intra-prediction and previously decoded image portions for subsequent motion compensation, to the pixel prediction processing unit 412. Such reference information may be provided from the reference cache 152 of the on-chip memory 150 to the pixel prediction processing unit 412. In some aspects, when the reference information is stored at the memory 110 (e.g., after eviction from the reference cache 152), the reference information may be provided from the memory 110 to the pixel prediction processing unit 412 via a path indicated by the dotted line.

The video decoder 124 may provide reconstructed pixels from the memory buffer(s) 156 to the display memory 144 for subsequent presentation on a display device. For example, the reconstructed pixels 132 are output from the memory buffer(s) 156 to the display memory 144, and are retrieved from or provided to the display memory 144 by the display unit 140 to generate the video data output 142 provided to the display device 104 of FIG. 1. In some implementations, the reconstructed pixels 132 may be saved to the memory 110 through the on-chip memory 150, depending on a particular usage and/or configuration of the on-chip memory 150, and may be retrieved from the memory 110 in response to a cache miss in the memory buffer(s) 156 by the display unit 140.

In some implementations, the video decoder 124 stores a first subset of the reconstructed pixels 132 in the memory buffer(s) 156, stores a second subset of the reconstructed pixels 134 in the memory buffer(s) 156, and generates a third subset of the adjusted pixels 130 based on the first subset and the second subset. For example, the first subset corresponds to a first boundary (e.g., a right boundary) of the first image portion 162, the second subset corresponds to a second boundary (e.g., a left boundary) of the second image portion 164, and the third subset corresponds to the first boundary (e.g., a right boundary) of an adjusted and reconstructed version of the first image portion 162. To illustrate, the video decoder 124 updates the first subset of the reconstructed pixels 132 based on the third subset to generate the adjusted pixels 130.

Figure 5:
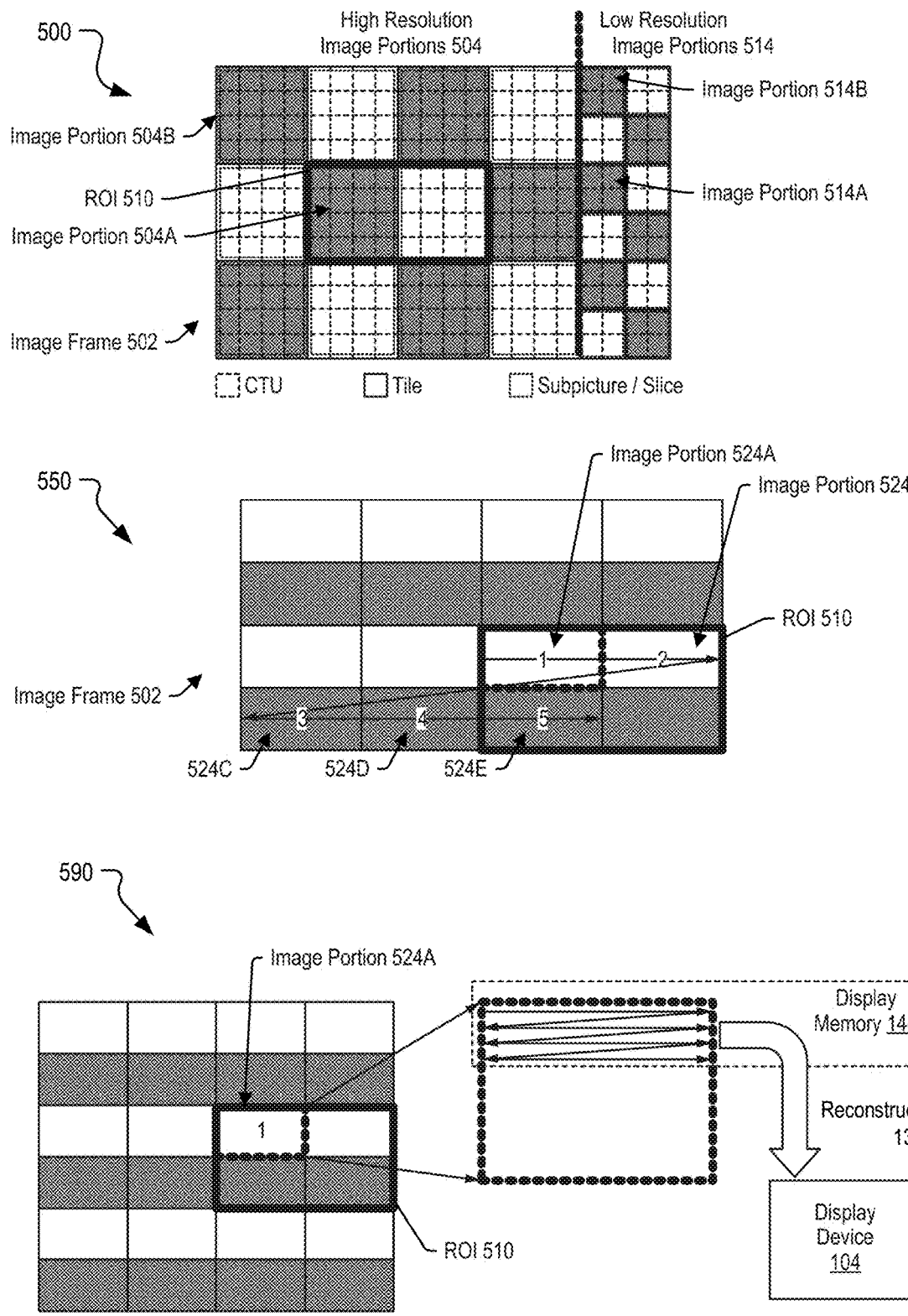
FIG. 5 is a diagram illustrating an example of a video decoding operation that can be implemented in the system of FIG. 1, in accordance with some examples of the present disclosure.

FIG. 5 is a diagram illustrating an example of a video decoding operation that can be implemented in the system 100 of FIG. 1, in accordance with some examples of the present disclosure.

An example 500 depicts that an image frame 502 can be logically divided into a plurality of image portions 504. An image portion 504 includes at least one of an image tile, an image region or an image subpicture of the image frame 502. The encoded video data 122 can include data representing the image portions 504 (e.g., high resolution versions), data representing image portions 514 that correspond to low resolution versions of the image portions 504, or both. In an example, an image portion 514A corresponds to a low resolution version of the image portion 504A. As another example, an image portion 514B corresponds to a low resolution version of the image portion 504B. In some aspects, if decoded pixels of the image portion 504A are unavailable in time, the display unit 140 uses decoded pixels of the image portion 514A to generate the video data output 142 of FIG. 1.

In some examples, the image frame 502 includes a ROI 510 associated with a viewing direction of a user. The ROI 510 includes one or more image portions 504, such as the image portion 504A, one or more additional image portions, or a combination thereof. One or more image portions 514 are also considered included in the ROI 510 that correspond to the image portion(s) 504 that are included in the ROI 510.

Delay associated with displaying a representation of image portions included in the ROI 510 has a greater adverse impact on user experience. In some implementations, the display unit 140 of FIG. 1 uses the decoded pixels of image portions 504 (e.g., higher resolution image portions) that are included in the ROI 510, and uses decoded pixels of image portions 514 (e.g., lower resolution image portions) that are not included in the ROI 510 to generate the video data output 142.

An example 550 depicts an image frame 502 including a plurality of image portions 524. An image portion 524 corresponds to an image portion 504 or an image portion 514 (e.g., a lower resolution version of the image portion 504). The example 550 depicts a left-to-right and top-to-bottom reconstruction of image portions 524 of the image frame 502. For example, an image portion 524A, an image portion 524B, an image portion 524C, an image portion 524D, and an image portion 524E of the encoded video data 122 are processed in sequential order to generate first reconstructed pixels, second reconstructed pixels, third reconstructed pixels, fourth reconstructed pixels, and fifth reconstructed pixels, respectively.

If the image portion 524A depends on the image portion 524E, the video decoder 124 typically has to wait for reconstructed pixels of the image portion 524E to adjust the image portion 524A. For example, the video decoder 124 generates the first reconstructed pixels and then has to wait for the second reconstructed pixels, the third reconstructed pixels, the fourth reconstructed pixels, and the fifth reconstructed pixels to be generated and the first reconstructed pixels to be adjusted before the adjusted pixels are provided as a representation of the image portion 524A to the display memory 144. The delay between generating the first reconstructed pixels and generating the adjusted pixels corresponds to a latency associated with displaying a representation of the image portion 524A that can adversely impact user experience.

An example 590 depicts the video decoder 124 providing the reconstructed pixels to the display memory 144 prior to any adjustment of the reconstructed pixels. For example, the video decoder 124 provides the first reconstructed pixels, illustrated as reconstructed pixels 132, to the display memory 144 prior to generating the second reconstructed pixels. The display unit 140 can use the reconstructed pixels 132 from the display memory 144 to generate the video data output 142 of FIG. 1 for output to the display device 104. Sending the reconstructed pixels 132 to the display memory 144 prior to adjustment of the reconstructed pixels 132 based on later-reconstructed image portions reduces a latency associated with displaying a representation of the image portion 524A.

Figure 6:
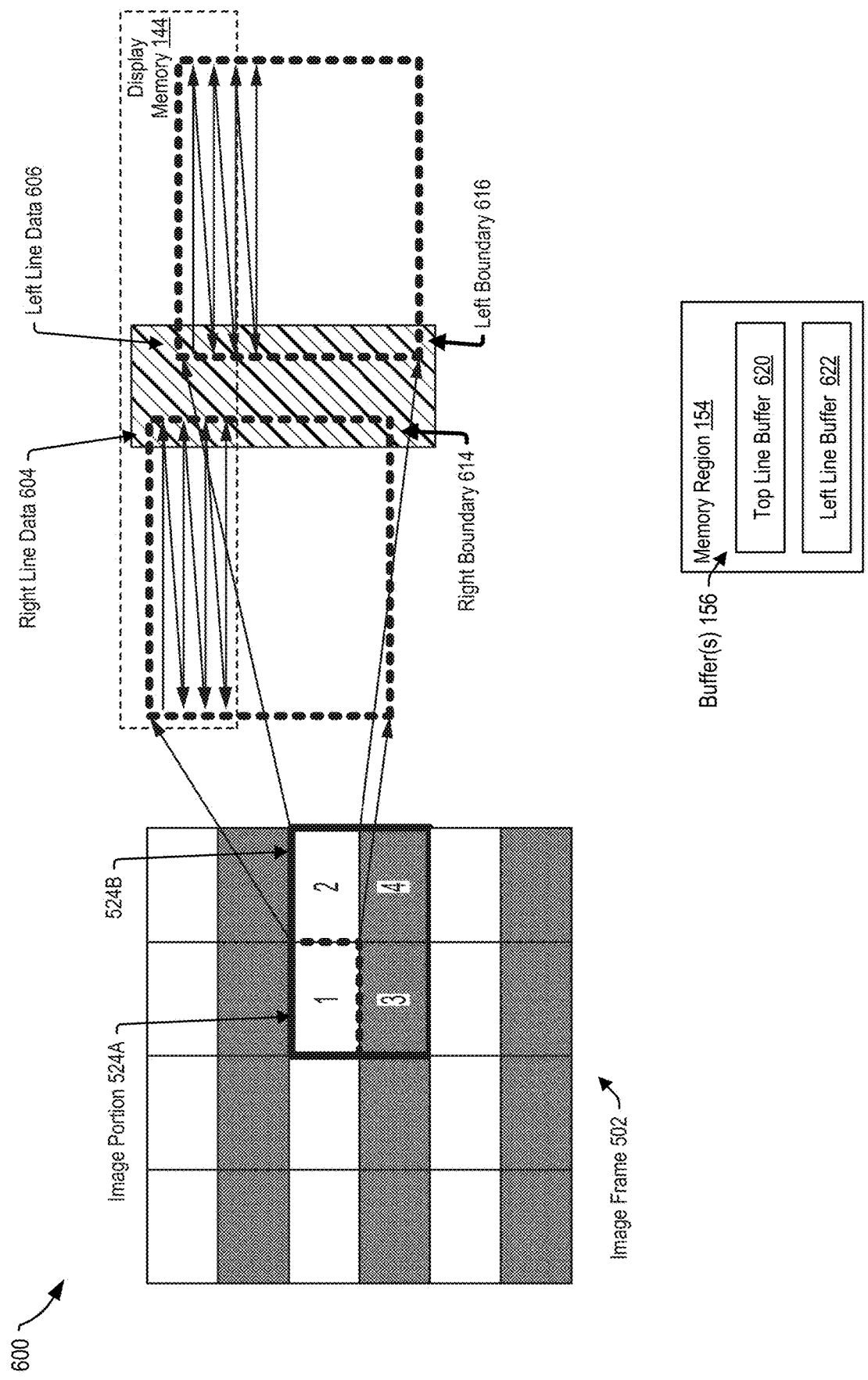
FIG. 6 is a block diagram illustrating an example of a video decoding operation that can be implemented in the system of FIG. 1, in accordance with some examples of the present disclosure.

FIG. 6 is a block diagram illustrating an example 600 of a video decoding operation that can be implemented in the system of FIG. 1, in accordance with some examples of the present disclosure.

The memory buffer(s) 156 include a top line buffer 620 to store top line buffer data, a left line buffer 622 to store left line buffer data, or both. The video decoder 124 processes (e.g., decodes) an image portion 524A of the encoded video data 122 to generate reconstructed pixels 132. The video decoder 124 sends the reconstructed pixels 132 to the display memory 144, as described with reference to FIG. 1.

In a particular aspect, the video decoder 124 stores at least a portion of the reconstructed pixels 132 corresponding to a bottom boundary (e.g., bottom boundary pixels) of the image portion 524A in the top line buffer 620. In a particular aspect, the video decoder 124 stores at least a portion (e.g., right line data 604) of the reconstructed pixels 132 corresponding to right boundary pixels of a right boundary 614 of the image portion 524A in the left line buffer 622. In an example, the right line data 604 corresponds to uncompressed boundary pixel data of the right boundary 614.

The video decoder 124 processes (e.g., decodes) an image portion 524B of the encoded video data 122 to generate reconstructed pixels 134. In the example 600, the image portion 524B is adjacent and to the right of the image portion 524A in an image frame 502. The video decoder 124, in response to determining that the image portion 524A has a dependence on the image portion 524B, adjusts the reconstructed pixels 132 based on the reconstructed pixels 134 to generate adjusted pixels 130. The adjusted pixels 130 are thus generated subsequent to sending the reconstructed pixels 132 to the display memory 144.

In an example, the video decoder 124 adjusts the right line data 604 in the left line buffer 622 based on left line data 606 (e.g., uncompressed boundary pixel data) corresponding to left boundary pixels of a left boundary 616 of the image portion 524 to generate adjusted right line data. In a particular aspect, the video decoder 124 stores the right line data 604 (e.g., uncompressed boundary pixel data) corresponding to the right boundary pixels of the Image portion 524A in a first portion of a line buffer (e.g., the left line buffer 622). The video decoder 124, after generating the left boundary pixels of the image portion 524B, stores the left line data 606 (e.g., uncompressed boundary pixel data) corresponding to the left boundary pixels in a second portion of the same line buffer or another line buffer of the memory buffers 156 to enable adjustment (e.g., filtering) of the right boundary pixels and the left boundary pixels.

In a particular aspect, the video decoder 124 applies an image filter to the right line data 604 and the left line data 606 to generate adjusted right line data. In a particular aspect, the right line data 604 is adjusted in the line buffer (e.g., the left line buffer 622) and converted to the adjusted right line data. Adjusting the right line data 604 in a line buffer (e.g., the left line buffer 622) at the on-chip memory 150, subsequent to sending the reconstructed pixels 132 to the display memory 144, reduces a latency associated with availability of the adjusted pixels 130 as reference pixels. For example, a latency associated with retrieving the right line data 604 from the memory 110 to perform the adjustment is removed. In some implementations, reconstructed pixels are compressed for storage in the memory 110, adjusting the right line data 604 that is stored as uncompressed data in the line buffer (e.g., the left line buffer 622) at the on-chip memory 150 also removes a latency associated with uncompressing the right line data 604 retrieved from the memory 110 to perform the adjustment.

The video decoder 124 stores the adjusted pixels 130 in the on-chip memory 150, the memory 110, or both. In a particular aspect, the adjusted pixels 130 are stored into the reference cache 152 and are available for use by the pixel prediction processing unit 412 of FIG. 4 as reference data to decode additional image portions. However, in some cases, such as based on the size of the reference cache 152 and a management policy used by the device 102, the adjusted pixels 130 may be evicted from the reference cache 152 and stored into the memory 110, and the pixel prediction processing unit 412 may (e.g., after a cache miss in the reference cache 152) retrieve the adjusted pixels 130 from the memory 110 to use as reference data.

The top line buffer 620 and the left line buffer 622 are provided as illustrative non-limiting examples of the memory buffer(s) 156, in other examples the memory buffer(s) 156 can include various other types of buffers in addition to, or as an alternative to, the top line buffer 620, the left line buffer 622, or both, that fit in the memory region 154. As an example, the memory buffer(s) 156 can include a ROI reference buffer to store ROI reference data, a prediction unit buffer to store prediction unit data, one or more buffers to store other types of data, or a combination thereof. Having the various types of buffers in the on-chip memory 150 can result in power savings, bandwidth saving, read and write latency reduction, or a combination thereof.

Figure 7:
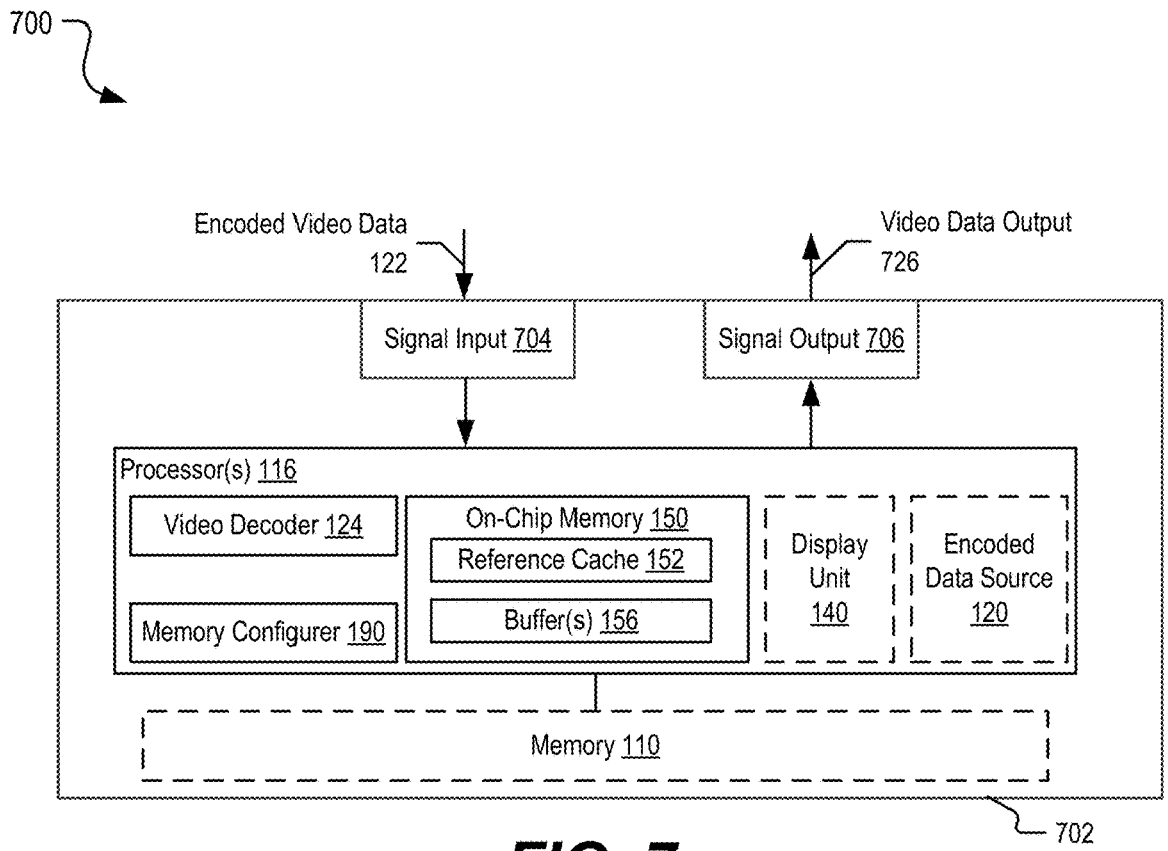
FIG. 7 is a block diagram illustrating an implementation of an integrated circuit operable to perform video decoding using a video decoder with a configurable reference cache and on-chip memory buffer, in accordance with some examples of the present disclosure.

FIG. 7 is a block diagram illustrating an implementation 700 of the device 102 as an integrated circuit 702 for performing video decoding using a video decoder with a configurable reference cache 152 and on-chip memory buffer (e.g., the memory buffer(s) 156). The integrated circuit 702 includes the one or more processors 116, which include the video decoder 124, the memory configurer 190, and the on-chip memory 150 with the reference cache 152 and the memory buffer(s) 156. Optionally, the integrated circuit 702 also includes the memory 110, the encoded data source 120, the display unit 140, or any combination thereof. The integrated circuit 702 also includes a signal input 704, such as a bus interface, to enable the encoded video data 122 to be received. The integrated circuit 702 includes a signal output 706, such as a bus interface, to enable outputting a video data output 726, such as the video data output 142 or a sequence of image portions including the reconstructed pixels 132. The integrated circuit 702 enables implementation of video decoding using the configurable reference cache 152 and on-chip memory buffer (e.g., the memory buffer(s) 156) as a component in a system that performs video decoding playback, such as depicted in FIG. 1.

FIG. 8 depicts an implementation 800 in which the device 102 includes a mobile device 802, such as a phone or tablet, as illustrative, non-limiting examples. The mobile device 802 includes a display screen 804. The video decoder 124 with the configurable reference cache 152 and on-chip memory buffer (e.g., the memory buffer(s) 156) is integrated in the mobile device 802, such as in the integrated circuit 702 that is illustrated using dashed lines to indicate internal components that are not generally visible to a user of the mobile device 802. In a particular example, the video decoder 124 operates to perform video decoding using the configurable reference cache 152 and on-chip memory buffer (e.g., the memory buffer(s) 156). For example, the mobile device 802 may receive encoded video data from a remote device (e.g., a phone or computer device of another participant on a video conference), decode the encoded video data using the video decoder 124, output the reconstructed pixels to a display memory, and display the resulting decoded video at the display screen 804.

FIG. 9 depicts an implementation 900 in which the device 102 includes a portable electronic device that corresponds to a camera device 902. The video decoder 124 with the configurable reference cache 152 and on-chip memory buffer (e.g., the memory buffer(s) 156) is integrated in the camera device 902, such as in the integrated circuit 702. During operation, the video decoder 124 performs video decoding using the configurable reference cache 152 and on-chip memory buffer (e.g., the memory buffer(s) 156) during playback of video data via a display of the camera device 902, such as video data that is captured by the camera device 902 and stored as encoded video data at a memory of the camera device 902.

FIG. 10 depicts an implementation 1000 of a wearable electronic device 1002, illustrated as a "smart watch." In a particular aspect, the wearable electronic device 1002 includes the device 102. The video decoder 124 with the configurable reference cache 152 and on-chip memory buffer (e.g., the memory buffer(s) 156) is integrated in the wearable electronic device 1002, such as in the integrated circuit 702. In a particular aspect, the wearable electronic device 1002 is coupled to or includes a display screen 1004 to display video data decoded by the video decoder 124, and the video decoder 124 operates to perform video decoding using the configurable reference cache 152 and on-chip memory buffer (e.g., the memory buffer(s) 156). In a particular example, the wearable electronic device 1002 includes a haptic device that provides a haptic notification (e.g., vibrates) associated with playback of decoded video data via the display screen 1004. For example, the haptic notification can cause a user to look at the wearable electronic device 1002 to watch video playback, such as a video announcement of an incoming video phone call or a video message received at the wearable electronic device 1002.

FIG. 11 depicts an implementation 1100 in which the device 102 includes a portable electronic device that corresponds to an extended reality device, such as augmented reality or mixed reality glasses 1102. The glasses 1102 include a holographic projection unit 1104 configured to project visual data onto a surface of a lens 1106 or to reflect the visual data off of a surface of the lens 1106 and onto the wearer's retina. The video decoder 124 with the configurable reference cache 152 and on-chip memory buffer (e.g., the memory buffer(s) 156) is integrated in the glasses 1102, such as in the integrated circuit 702. In a particular aspect, the video decoder 124 operates to perform video decoding using the configurable reference cache 152 and on-chip memory buffer (e.g., the memory buffer(s) 156) during playback of video data via a projection onto the surface of the lens 1106 (e.g., the display device 104) to enable display of video associated with augmented reality, mixed reality, or virtual reality scenes to the user while the glasses 1102 are worn.

FIG. 12 depicts an implementation 1200 of a portable electronic device that corresponds to a virtual reality, augmented reality, or mixed reality headset 1202. In a particular aspect, the headset 1202 includes the device 102 of FIG. 1. The video decoder 124 with the configurable reference cache 152 and on-chip memory buffer (e.g., the memory buffer(s) 156) is integrated in the headset 1202, such as in the integrated circuit 702. In a particular aspect, the video decoder 124 operates to perform video decoding using the configurable reference cache 152 and on-chip memory buffer (e.g., the memory buffer(s) 156) during playback of video data via a visual interface device 1204 (e.g., the display device 104). The visual interface device 1204 is positioned in front of the user's eyes to enable display of video associated with augmented reality, mixed reality, or virtual reality scenes to the user while the headset 1202 is worn.

FIG. 13 is an implementation 1300 of a wireless speaker and voice activated device 1302. In a particular aspect, the wireless speaker and voice activated device 1302 includes the device 102 of FIG. 1. The wireless speaker and voice activated device 1302 can have wireless network connectivity and is configured to execute an assistant operation. The one or more processors 116 are included in the wireless speaker and voice activated device 1302 and include the video decoder 124 and the memory configurer 190. In a particular aspect, the wireless speaker and voice activated device 1302 includes one or more microphones 1310 and one or more speakers 1304, and also includes or is coupled to a display device 1320 for playback of video that is output by the video decoder 124. During operation, the video decoder 124 performs video decoding using the configurable reference cache 152 and on-chip memory buffer (e.g., the memory buffer(s) 156) during playback of video data via the display device 1320. In response to receiving a verbal command via one or more microphones 1310, the wireless speaker and voice activated device 1302 can execute assistant operations, such as via execution of a voice activation system (e.g., an integrated assistant application). The assistant operations can include adjusting a temperature, playing media content such as stored or streaming audio and video content, turning on lights, etc. For example, the assistant operations are performed responsive to receiving a command after a keyword or key phrase (e.g., "hello assistant").

FIG. 14 depicts an implementation 1400 in which the device 102 corresponds to or is integrated within a vehicle 1402, illustrated as a manned or unmanned aerial device (e.g., a package delivery drone). The video decoder 124 with the configurable reference cache 152 and on-chip memory buffer (e.g., the memory buffer(s) 156) is integrated in the vehicle 1402, such as in the integrated circuit 702. The vehicle 1402 also includes a display device 1404 configured to display an output based on reconstructed pixels of image portions generated by the video decoder 124, such as the video data output 142.

The video decoder 124 operates to perform video decoding using the configurable reference cache 152 and on-chip memory buffer (e.g., the memory buffer(s) 156) during playback of video data that is decoded by the video decoder 124 and played back via a display device 1404. In some implementations, the vehicle 1402 is manned (e.g., carries a pilot, one or more passengers, or both), the display device 1404 is internal to a cabin of the vehicle 1402, and the video decoding using the configurable reference cache 152 and on-chip memory buffer (e.g., the memory buffer(s) 156) is performed during playback to a pilot or a passenger of the vehicle 1402. In another implementation, the vehicle 1402 is unmanned, the display device 1404 is mounted to an external surface of the vehicle 1402, and the video decoding using the configurable reference cache 152 and on-chip memory buffer (e.g., the memory buffer(s) 156) is performed during video playback to one or more viewers external to the vehicle 1402. For example, the vehicle 1402 may move (e.g., circle an outdoor audience during a concert) while playing out video such as advertisements or steaming video of the concert stage, and the one or more processors 116 (e.g., including the video decoder 124) may perform video decoding using the configurable reference cache 152 and on-chip memory buffer (e.g., the memory buffer(s) 156) to generate the video from an encoded video stream.

FIG. 15 depicts an implementation 1500 in which the device 102 corresponds to, or is integrated within, a vehicle 1502, illustrated as a car. The video decoder 124 with the configurable reference cache 152 and on-chip memory buffer (e.g., the memory buffer(s) 156) is integrated in the vehicle 1502, such as in the integrated circuit 702. The vehicle 1502 also includes a display device 1520 and one or more speakers 1510. In some implementations, the display device 1520 is configured to display video data output based on reconstructed pixels generated by the video decoder 124, such as the video data output 142. For example, the video data may correspond to streaming video data from a remote source (e.g., a remote media server), video stored at the vehicle 1502, such as entertainment content or instructional videos regarding operation of the vehicle 1502, or video captured via one or more camera sensors of the vehicle 1502, such as a backup camera.

Figure 16:
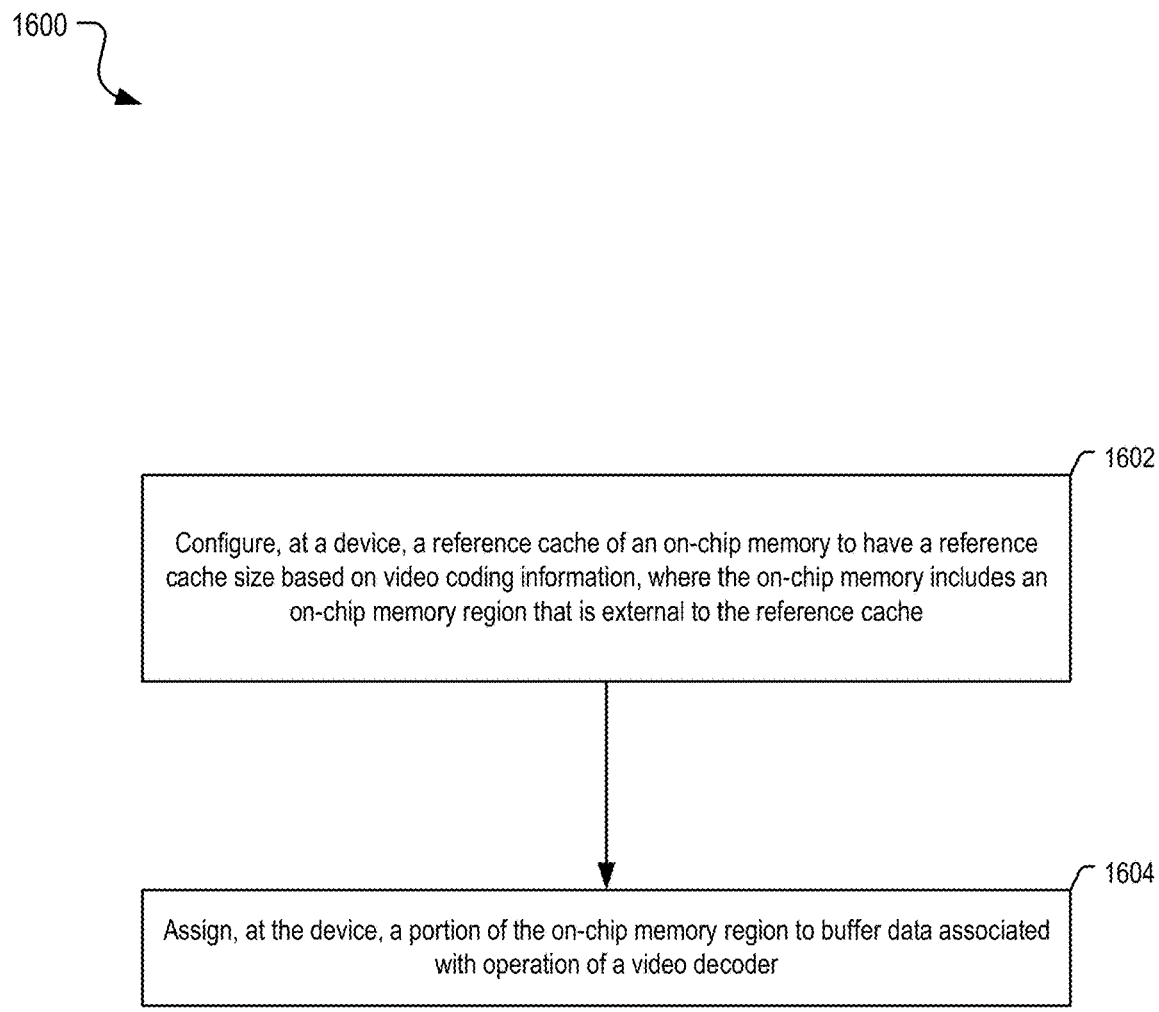
FIG. 16 is a diagram of a particular implementation of a method of processing video data using a video decoder with a configurable reference cache and on-chip memory buffer, in accordance with some examples of the present disclosure.

FIG. 16 illustrates an example of a method 1600 of decoding video data. One or more operations of the method 1600 may be performed by the system 100 of FIG. 1 (e.g., the device 102, the one or more processors 116, the memory configurer 190, or the video decoder 124), as an illustrative, non-limiting example.

The method 1600 includes, at block 1602, configuring, at a device, a reference cache of an on-chip memory to have a reference cache size based on video coding information. For example, the memory configurer 190 of FIG. 1 configures the reference cache 152 of the on-chip memory 150 to have a reference cache size 172 based on video coding information 192 of the video decoder 124, as described with reference to FIGS. 1-3. The reference cache 152 is configured to buffer pixel data (e.g., the reconstructed pixels 132) of one or more reference image portions (e.g., the first image portion 162). The on-chip memory 150 includes an on-chip memory region (e.g., the memory region 154) that is external to the reference cache 152.

The method 1600 includes, at block 1604, assigning, at the device, a portion of the on-chip memory region to buffer data associated with operation of a video decoder. For example, the video decoder 124 assigns a portion of the memory region 154 to the memory buffer(s) 156 to buffer data associated with operation of the video decoder 124, as described with reference to FIGS. 1-2.

The method 1600 of FIG. 16 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1600 of FIG. 16 may be performed by a processor that executes instructions, such as described with reference to FIG. 17.

Figure 17:
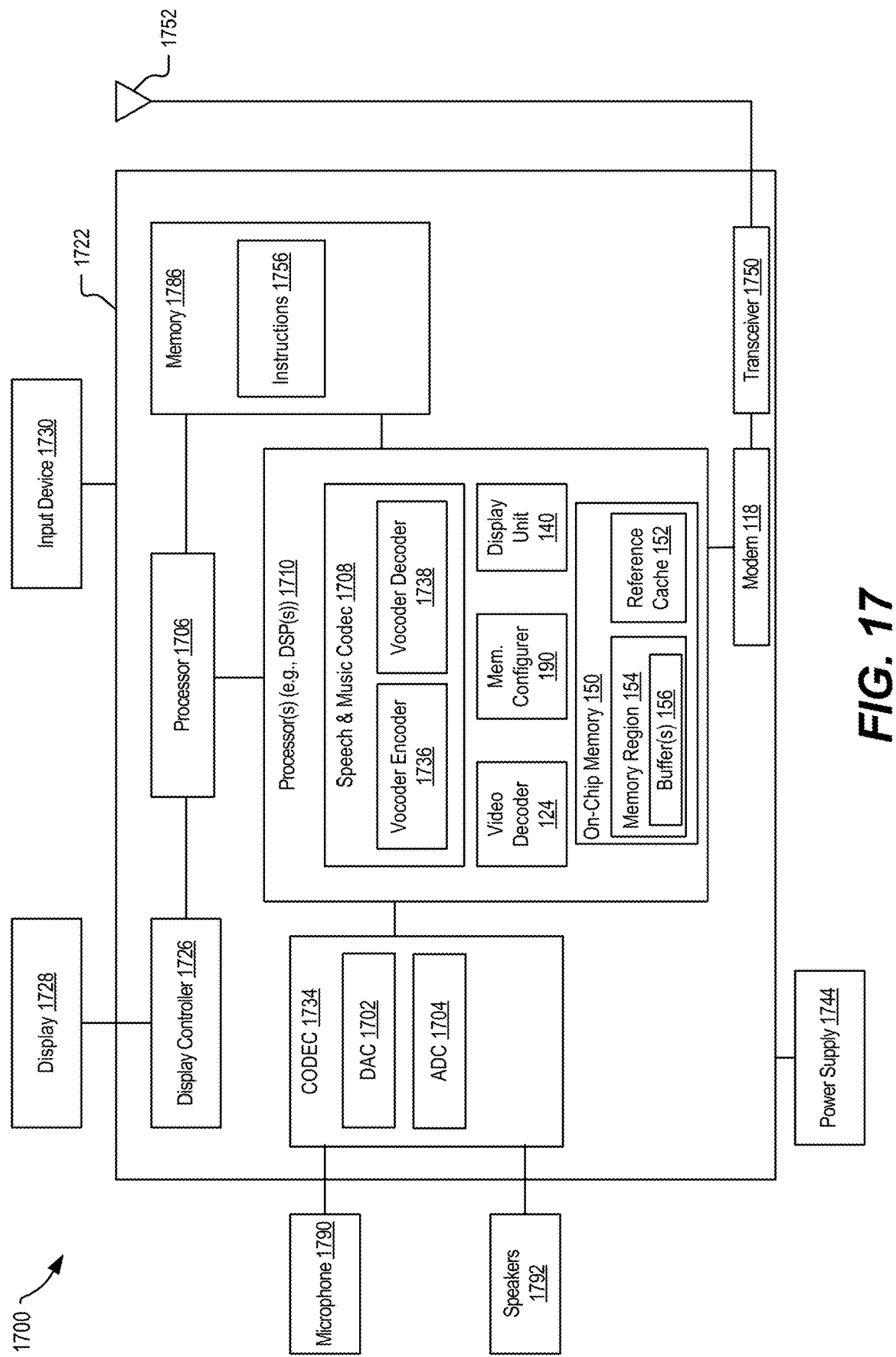
FIG. 17 is a block diagram of a particular illustrative example of a device that is operable to perform video decoding using a video decoder with a configurable reference cache and on-chip memory buffer, in accordance with some examples of the present disclosure.

Referring to FIG. 17, a block diagram of a particular illustrative implementation of a device is depicted and generally designated 1700. In various implementations, the device 1700 may have more or fewer components than illustrated in FIG. 17. In an illustrative implementation, the device 1700 may correspond to the device 102 of FIG. 1. In an illustrative implementation, the device 1700 may perform one or more operations described with reference to FIGS. 1-16.

In a particular implementation, the device 1700 includes a processor 1706 (e.g., a CPU). The device 1700 may include one or more additional processors 1710 (e.g., one or more DSPs). In a particular implementation, the one or more processors 116 of FIG. 1 correspond to the processor 1706, the processors 1710, or a combination thereof. For example, the processors 1710 may include the video decoder 124, the memory configurer 190, the on-chip memory 150, the display unit 140, and a speech and music coder-decoder (CODEC) 1708. The speech and music CODEC 1708 may include a voice coder ("vocoder") encoder 1736, a vocoder decoder 1738, or a combination thereof.

The device 1700 may include a memory 1786 and a CODEC 1734. The memory 1786 may include instructions 1756 that are executable by the one or more additional processors 1710 (or the processor 1706) to implement the functionality described with reference to the video decoder 124, the memory configurer 190, or both. In a particular example, the memory 1786 corresponds to the memory 110 and the instructions 1756 correspond to the instructions 112 of FIG. 1. The device 1700 may include the modem 118 coupled, via a transceiver 1750, to an antenna 1752.

The device 1700 may include a display 1728, such as the display device 104, coupled to a display controller 1726. One or more speakers 1792, one or more microphones 1790, or a combination thereof, may be coupled to the CODEC 1734. The CODEC 1734 may include a digital-to-analog converter (DAC) 1702 and an analog-to-digital converter (ADC) 1704. In a particular implementation, the CODEC 1734 may receive analog signals from the microphones 1790, convert the analog signals to digital signals using the analog-to-digital converter 1704, and send the digital signals to the speech and music codec 1708. In a particular implementation, the speech and music codec 1708 may provide digital signals to the CODEC 1734. The CODEC 1734 may convert the digital signals to analog signals using the digital-to-analog converter 1702 and may provide the analog signals to the speakers 1792.

In a particular implementation, the device 1700 may be included in a system-in-package or system-on-chip device 1722. In a particular implementation, the memory 1786, the processor 1706, the processors 1710, the display controller 1726, the CODEC 1734, and the modem 118 are included in a system-in-package or system-on-chip device 1722. In a particular implementation, an input device 1730 (e.g., a keyboard, a touchscreen, or a pointing device) and a power supply 1744 are coupled to the system-in-package or system-on-chip device 1722. Moreover, in a particular implementation, as illustrated in FIG. 17, the display 1728, the input device 1730, the speakers 1792, the microphones 1790, the antenna 1752, and the power supply 1744 are external to the system-in-package or system-on-chip device 1722. In a particular implementation, each of the display 1728, the input device 1730, the speakers 1792, the microphones 1790, the antenna 1752, and the power supply 1744 may be coupled to a component of the system-in-package or system-on-chip device 1722, such as an interface or a controller.

The device 1700 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an extended reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

In conjunction with the described techniques, an apparatus includes means for configuring a reference cache of an on-chip memory to have a reference cache size based on video coding information, where the on-chip memory includes an on-chip memory region that is external to the reference cache. In an example, the means for configuring can include the memory configurer 190, the one or more processors 116, the device 102, the system 100, one or more other circuits or devices to configure the reference cache, or a combination thereof.

The apparatus also includes means for assigning a portion of the on-chip memory region to buffer data associated with operation of a video decoder. In an example, the means for assigning can include the memory configurer 190, the one or more processors 116, the device 102, the system 100, one or more other circuits or devices to assign a portion of the on-chip memory region to buffer data associated with operation of a video decoder, or a combination thereof.

In some implementations, a non-transitory computer-readable medium (e.g., a computer-readable storage device, such as the memory 110) includes instructions (e.g., the instructions 112) that, when executed by one or more processors (e.g., the one or more processors 116), cause the one or more processors to perform operations corresponding to at least a portion of any of the techniques described with reference to FIGS. 1-15, the method of FIG. 16, or any combination thereof. For example, the instructions, when executed by the one or more processors, cause the one or more processors to configure a reference cache (e.g., the reference cache 152) of an on-chip memory (e.g., the on-chip memory 150) to have a reference cache size (e.g., the reference cache size 172) based on video coding information (e.g., the video coding information 192). The on-chip memory includes an on-chip memory region (e.g., the memory region 154) that is external to the reference cache. The instructions, when executed by the one or more processors, also cause the one or more processors to assign a portion of the on-chip memory region to buffer data associated with operation of a video decoder (e.g., the video decoder 124).

Particular aspects of the disclosure are described below in the following sets of interrelated Examples:

According to Example 1, a device includes an on-chip memory; and one or more processors coupled to the on-chip memory, the one or more processors configured to: configure a reference cache of the on-chip memory to have a reference cache size based on video coding information, wherein the on-chip memory includes an on-chip memory region that is external to the reference cache; and assign a portion of the on-chip memory region to buffer data associated with operation of a video decoder.

Example 2 includes the device of Example 1, wherein the video coding information includes codec or coding unit information.

Example 3 includes the device of Example 1 or Example 2, wherein the one or more processors are configured to update a register to indicate a cache width, a cache height, or a count of cache ways of the reference cache to configure the reference cache to have the reference cache size.

Example 4 includes the device of any of Examples 1 to 3, wherein the one or more processors are configured to update a register to assign the portion of the on-chip memory region to buffer the data associated with the operation of the video decoder.

Example 5 includes the device of any of Examples 1 to 4, wherein the portion of the on-chip memory region is assigned based on a size of the on-chip memory region.

Example 6 includes the device of any of Examples 1 to 5, wherein the data associated with the operation of the video decoder comprises top line buffer data, left line buffer data, or prediction unit data.

Example 7 includes the device of any of Examples 1 to 6, wherein assignment of the portion of the on-chip memory region to buffer the data produced during the operation of the video decoder reduces traffic to off-chip memory.

Example 8 includes the device of any of Examples 1 to 7, wherein the reference cache size is selected to satisfy a target cache miss rate.

Example 9 includes the device of any of Examples 1 to 8, wherein the one or more processors are configured to, based on the video coding information, configure the reference cache of the on-chip memory to have the reference cache size of 40 kilobytes, 60 kilobytes, 80 kilobytes, 120 kilobytes, or 140 kilobytes.

Example 10 includes the device of any of Examples 1 to 9, wherein the one or more processors are configured to generate reconstructed pixels of an image; and send the reconstructed pixels to a display memory prior to adjustment of the reconstructed pixels based on dependency on a later-reconstructed image.

Example 11 includes the device of Example 10, wherein sending the reconstructed pixels to the display memory prior to the adjustment of the reconstructed pixels reduces a display latency.

Example 12 includes the device of Example 10 or Example 11, wherein the image includes at least one of an image tile, an image region, or an image subpicture.

Example 13 includes the device of any of Example 10 to 12, wherein the image is within a region of interest associated with a viewing direction of a user.

Example 14 includes the device of any of Examples 10 to 13, wherein the one or more processors are configured to adjust the reconstructed pixels subsequent to sending the reconstructed pixels to the display memory.

Example 15 includes the device of any of Examples 10 to 14, wherein the one or more processors are configured to store the reconstructed pixels in a line buffer included in the portion of the on-chip memory region; subsequent to sending the reconstructed pixels to the display memory, adjust the reconstructed pixels to generate adjusted pixels; and store the adjusted pixels in the reference cache or off-chip memory.

Example 16 includes the device of Example 15, wherein adjusting the reconstructed pixels in the line buffer, subsequent to sending the reconstructed pixels to the display memory, reduces a latency associated with availability of the adjusted pixels as reference pixels.

Example 17 includes the device of any of Examples 1 to 16, wherein the one or more processors are configured to send reconstructed pixels of an image to a display memory independently of dependency on a later-reconstructed image.

Example 18 includes the device of Example 17, wherein the one or more processors are configured to, subsequent to sending the reconstructed pixels to the display memory, adjust the reconstructed pixels based on the dependency on the later-reconstructed image to generate adjusted pixels for use as reference pixels.

Example 19 includes the device of Example 17 or Example 18, wherein the one or more processors are configured to apply an image filter to adjust the reconstructed pixels.

Example 20 includes the device of Example 19, wherein sending the reconstructed pixels to the display memory prior to applying the image filter reduces a latency associated with displaying the image.

Example 21 includes the device of Example 19 or Example 20, wherein the image filter includes at least one of a deblocking filter, a sample adaptive offset filter, an adaptive loop filter, a cross-component adaptive loop filter, or a luma mapping filter.

Example 22 includes the device of any of Examples 1 to 21, wherein the one or more processors are configured to generate first boundary pixels of an image; store first uncompressed pixel data corresponding to the first boundary pixels to a first portion of a line buffer, the line buffer included in the portion of the on-chip memory region; and after generating second boundary pixels of a later-reconstructed image, store second uncompressed boundary pixel data corresponding to the second boundary pixels to a second portion of the line buffer to enable filtering of the first boundary pixels and the second boundary pixels.

Example 23 includes the device of any of Examples 1 to 22, wherein the on-chip memory and the one or more processors are integrated into an extended reality (XR) device.

Example 24 includes the device of any of Examples 1 to 23, wherein the on-chip memory and the one or more processors are integrated into at least one of a mobile device, an internet-of-things (IoT) device, a computer, or a vehicle.

According to Example 25, a method includes configuring, at a device, a reference cache of an on-chip memory to have a reference cache size based on video coding information, wherein the on-chip memory includes an on-chip memory region that is external to the reference cache; and assigning, at the device, a portion of the on-chip memory region to buffer data associated with operation of a video decoder.

Example 26 includes the method of Example 25, wherein the video coding information includes codec or coding unit information.

Example 27 includes the method of Example 25 or Example 26, further comprising updating, at the device, a register to indicate a cache width, a cache height, or a count of cache ways of the reference cache to configure the reference cache to have the reference cache size.

Example 28 includes the method of any of Examples 25 to 27, further comprising updating, at the device, a register to assign the portion of the on-chip memory region to buffer the data associated with the operation of the video decoder.

Example 29 includes the method of any of Examples 25 to 28, wherein the portion of the on-chip memory region is assigned based on a size of the on-chip memory region.

Example 30 includes the method of any of Examples 25 to 29, wherein data associated with the operation of the video decoder comprises top line buffer data, left line buffer data, or prediction unit data.

Example 31 includes the method of any of Examples 25 to 30, wherein assignment of the portion of the on-chip memory region to buffer the data produced during the operation of the video decoder reduces traffic to off-chip memory.

Example 32 includes the method of any of Examples 25 to 31, wherein the reference cache size is selected to satisfy a target cache miss rate.

Example 33 includes the method of any of Examples 25 to 32, wherein the reference cache of the on-chip memory is configured, based on the video coding information, to have the reference cache size of 40 kilobytes, 60 kilobytes, 80 kilobytes, 120 kilobytes, or 140 kilobytes.

Example 34 includes the method of any of Examples 25 to 33, and further includes generating, at the device, reconstructed pixels of an image; and sending the reconstructed pixels to a display memory prior to adjustment of the reconstructed pixels based on dependency on a later-reconstructed image.

Example 35 includes the method of Example 34, wherein sending the reconstructed pixels to the display memory prior to the adjustment of the reconstructed pixels reduces a display latency.

Example 36 includes the method of Example 34 or Example 35, wherein the image includes at least one of an image tile, an image region, or an image subpicture.

Example 37 includes the method of any of Examples 34 to 36, wherein the image is within a region of interest associated with a viewing direction of a user.

Example 38 includes the method of any of Examples 34 to 37, and further includes adjusting, at the device, the reconstructed pixels subsequent to sending the reconstructed pixels to the display memory.

Example 39 includes the method of any of Examples 34 to 38, and further includes storing the reconstructed pixels in a line buffer included in the portion of the on-chip memory region; subsequent to sending the reconstructed pixels to the display memory, adjust the reconstructed pixels to generate adjusted pixels; and storing the adjusted pixels in the reference cache or off-chip memory.

Example 40 includes the method of Example 39, wherein adjusting the reconstructed pixels in the line buffer, subsequent to sending the reconstructed pixels to the display memory, reduces a latency associated with availability of the adjusted pixels as reference pixels.

Example 41 includes the method of any of Examples 25 to 40, and further includes sending reconstructed pixels of an image to a display memory independently of dependency on a later-reconstructed image.

Example 42 includes the method of Example 41, and further includes, subsequent to sending the reconstructed pixels to the display memory, adjusting the reconstructed pixels based on the dependency on the later-reconstructed image to generate adjusted pixels for use as reference pixels.

Example 43 includes the method of Example 41 or Example 42, and further includes applying an image filter to adjust the reconstructed pixels.

Example 44 includes the method of Example 43, wherein sending the reconstructed pixels to the display memory prior to applying the image filter reduces a latency associated with displaying the image.

Example 45 includes the method of Example 43 or Example 44, wherein the image filter includes at least one of a deblocking filter, a sample adaptive offset filter, an adaptive loop filter, a cross-component adaptive loop filter, or a luma mapping filter.

Example 46 includes the method of any of Examples 25 to 45, and further includes generating first boundary pixels of an image; storing first uncompressed pixel data corresponding to the first boundary pixels to a first portion of a line buffer, the line buffer included in the portion of the on-chip memory region; and after generating second boundary pixels of a later-reconstructed image, storing second uncompressed boundary pixel data corresponding to the second boundary pixels to a second portion of the line buffer to enable filtering of the first boundary pixels and the second boundary pixels.

Example 47 includes the method of any of Examples 25 to 46, wherein the on-chip memory is integrated into an extended reality (XR) device.

Example 48 includes the method of any of Examples 25 to 47, wherein the on-chip memory is integrated into at least one of a mobile device, an internet-of-things (IoT) device, a computer, or a vehicle.

According to Example 49, a non-transitory computer-readable medium storing instructions that, when executed by one or more processors, cause the one or more processors to configure a reference cache of an on-chip memory to have a reference cache size based on video coding information, wherein the on-chip memory includes an on-chip memory region that is external to the reference cache; and assign a portion of the on-chip memory region to buffer data associated with operation of a video decoder.

Example 50 includes the non-transitory computer-readable medium of Example 49, wherein the instructions, when executed by the one or more processors, cause the one or more processors to update a register to indicate a cache width, a cache height, or a count of cache ways of the reference cache to configure the reference cache to have the reference cache size.

According to Example 51, an apparatus includes: means for configuring a reference cache of an on-chip memory to have a reference cache size based on video coding information, wherein the on-chip memory includes an on-chip memory region that is external to the reference cache; and means for assigning a portion of the on-chip memory region to buffer data associated with operation of a video decoder.

Example 52 includes the apparatus of Example 51, wherein the means for configuring and the means for assigning are integrated into at least one of a mobile communication device, a computer, a display device, a gaming console, a camera, a navigation device, a vehicle, a headset, an extended reality headset, an aerial vehicle, a vehicle, or an internet-of-things (IoT) device.

Those of skill would further appreciate that the various illustrative logical blocks, configurations, circuits, and algorithm steps described in connection with the implementations disclosed herein may be implemented as electronic hardware, computer software executed by a processing device such as a hardware processor, or combinations of both. Various illustrative components, blocks, configurations, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:
   an on-chip memory; and
   one or more processors coupled to the on-chip memory, the one or more processors configured to:
   configure a reference cache of the on-chip memory to have a reference cache size based on video coding information, wherein the on-chip memory includes an on-chip memory region that is external to the reference cache;
   assign a portion of the on-chip memory region to buffer data associated with operation of a video decoder;
   generate reconstructed pixels of an image;
   store the reconstructed pixels in a line buffer included in the portion of the on-chip memory region;
   send the reconstructed pixels to a display memory prior to adjustment of the reconstructed pixels based on dependency on a later-reconstructed image, wherein the later-reconstructed image is reconstructed after the image;
   subsequent to when the reconstructed pixels are sent to the display memory, adjust the reconstructed pixels to generate adjusted pixels; and
   store the adjusted pixels in the reference cache or off-chip memory.

2. The device of claim 1, wherein the video coding information includes codec or coding unit information.

3. The device of claim 1, wherein the one or more processors are configured to update a register to indicate a cache width, a cache height, or a count of cache ways of the reference cache to configure the reference cache to have the reference cache size.

4. The device of claim 1, wherein the one or more processors are configured to update a register to assign the portion of the on-chip memory region to buffer the data associated with the operation of the video decoder.

5. The device of claim 1, wherein the portion of the on-chip memory region is assigned based on a size of the on-chip memory region.

6. The device of claim 1, wherein the data associated with the operation of the video decoder comprises top line buffer data, left line buffer data, or prediction unit data.

7. The device of claim 1, wherein the reference cache size is selected to satisfy a target cache miss rate.

8. The device of claim 1, wherein the one or more processors are configured to, based on the video coding information, configure the reference cache of the on-chip memory to have the reference cache size of 40 kilobytes, 60 kilobytes, 80 kilobytes, 120 kilobytes, or 140 kilobytes.

9. The device of claim 1, wherein the image is within a region of interest associated with a viewing direction of a user.

10. The device of claim 1, wherein the one or more processors are configured to send second reconstructed pixels of a second image to the display memory independently of dependency on a second later-reconstructed image, wherein the second later-reconstructed image is reconstructed after the second image.

11. The device of claim 10, wherein the one or more processors are configured to, subsequent to sending the second reconstructed pixels to the display memory, adjust the second reconstructed pixels based on the dependency on the second later-reconstructed image to generate second adjusted pixels for use as reference pixels.

12. The device of claim 10, wherein the one or more processors are configured to apply an image filter to adjust the second reconstructed pixels.

13. The device of claim 1, wherein the one or more processors are configured to:
   generate first boundary pixels of a second image;
   store first uncompressed pixel data corresponding to the first boundary pixels to a first portion of a line buffer, the line buffer included in the portion of the on-chip memory region; and
   after generating second boundary pixels of a second later-reconstructed image, storing second uncompressed boundary pixel data corresponding to the second boundary pixels to a second portion of the line buffer to enable filtering of the first boundary pixels and the second boundary pixels, wherein the second later-reconstructed image is reconstructed after the second image.

14. The device of claim 1, wherein the on-chip memory and the one or more processors are integrated into at least one of an extended reality (XR) device, a mobile device, an internet-of-things (IoT) device, a computer, or a vehicle.

15. A method comprising:
   configuring, at a device, a reference cache of an on-chip memory to have a reference cache size based on video coding information, wherein the on-chip memory includes an on-chip memory region that is external to the reference cache;
   assigning, at the device, a portion of the on-chip memory region to buffer data associated with operation of a video decoder;
   generating reconstructed pixels of an image;
   storing the reconstructed pixels in a line buffer included in the portion of the on-chip memory region;
   sending the reconstructed pixels to a display memory prior to adjustment of the reconstructed pixels based on dependency on a later-reconstructed image, wherein the later-reconstructed image is reconstructed after the image;
   subsequent to sending the reconstructed pixels to the display memory, adjusting the reconstructed pixels to generate adjusted pixels; and
   storing the adjusted pixels in the reference cache or off-chip memory.

16. The method of claim 15, wherein the video coding information includes codec or coding unit information.

17. A non-transitory computer-readable medium storing instructions that, when executed by one or more processors, cause the one or more processors to:
   configure a reference cache of an on-chip memory to have a reference cache size based on video coding information, wherein the on-chip memory includes an on-chip memory region that is external to the reference cache;

assign a portion of the on-chip memory region to buffer data associated with operation of a video decoder;

generate reconstructed pixels of an image;

store the reconstructed pixels in a line buffer included in the portion of the on-chip memory region;

send the reconstructed pixels to a display memory prior to adjustment of the reconstructed pixels based on dependency on a later-reconstructed image, wherein the later-reconstructed image is reconstructed after the image;

subsequent to when the reconstructed pixels are sent to the display memory, adjust the reconstructed pixels to generate adjusted pixels; and store the adjusted pixels in the reference cache or off-chip memory.

18. The non-transitory computer-readable medium of claim 17, wherein the instructions, when executed by the one or more processors, cause the one or more processors to update a register to indicate a cache width, a cache height, or a count of cache ways of the reference cache to configure the reference cache to have the reference cache size.

19. The method of claim 15, further comprising updating a register to indicate a cache width, a cache height, or a count of cache ways of the reference cache to configure the reference cache to have the reference cache size.

20. The method of claim 15, wherein the portion of the on-chip memory region is assigned based on a size of the on-chip memory region.

* * * * *